(12) United States Patent
Ito

(10) Patent No.: US 12,099,249 B2
(45) Date of Patent: Sep. 24, 2024

(54) LENS SUPPORT MECHANISM, AND LENS BARREL AND CAMERA PROVIDED WITH THE LENS SUPPORT MECHANISM

(71) Applicant: Panasonic Intellectual Property Management Co., Ltd., Osaka (JP)

(72) Inventor: Daisuke Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 578 days.

(21) Appl. No.: 17/368,438

(22) Filed: Jul. 6, 2021

(65) Prior Publication Data

US 2022/0082779 A1 Mar. 17, 2022

(30) Foreign Application Priority Data

Sep. 17, 2020 (JP) .................................. 2020-156451

(51) Int. Cl.
*G02B 7/02* (2021.01)
*G02B 9/62* (2006.01)
*G03B 17/12* (2021.01)

(52) U.S. Cl.
CPC ............. *G02B 7/022* (2013.01); *G02B 7/023* (2013.01); *G02B 9/62* (2013.01); *G03B 17/12* (2013.01)

(58) Field of Classification Search
CPC .......... G02B 7/022; G02B 7/023; G02B 9/62; G03B 17/12; G03B 17/14;
(Continued)

(56) References Cited

U.S. PATENT DOCUMENTS 6,765,728 B2 7/2004 Kabe
8,339,503 B2 12/2012 Yumiki
(Continued)

FOREIGN PATENT DOCUMENTS

JP  H03-098007 A  4/1991
JP  H0694964 A   4/1994
(Continued)

OTHER PUBLICATIONS

Notice of Reasons for Refusal dated Jan. 23, 2024 in corresponding Japanese Patent Application No. 2020-156451, with English Translation.

(Continued)

*Primary Examiner* — Mustak Choudhury
(74) *Attorney, Agent, or Firm* — Renner, Otto, Boisselle & Sklar, LLP

(57) ABSTRACT

A lens support mechanism (10) comprises a fourth lens group unit (24), a sixth lens group unit (26), a rectilinear cylinder 11, a cam cylinder (12), and a guide shaft (29a). The rectilinear cylinder 11 is provided on the outer peripheral side of the fourth lens group unit 24 and the sixth lens group unit 26, and has a rectilinear groove 11e into which a cam follower 24b and a main cam follower 26ba are inserted to restrict the rotation of the fourth lens group unit 24. A cam groove 12e and a cam groove 12h with which the cam follower 24b and the main cam follower 26ba are engaged are formed in the cam cylinder 12, and when the cam cylinder 12 rotates with respect to the rectilinear cylinder 11, this moves the fourth lens group unit 24 and the sixth lens group unit 26 in the optical axis OP direction. The guide shaft 29a is fixed at a first end to the fourth lens group unit 24 and inserted into the insertion opening 26c to guide the sixth lens group unit 26 in the optical axis OP direction.

12 Claims, 20 Drawing Sheets

(58) Field of Classification Search
CPC .... G03B 2205/0046; G03B 2205/0053; G03B 3/02; G03B 5/00
See application file for complete search history.

(56) References Cited

U.S. PATENT DOCUMENTS

| | | | |
|---|---|---|---|
| 8,730,376 | B2 | 5/2014 | Yumiki |
| 8,834,044 | B2 | 9/2014 | Uehara et al. |
| 11,067,769 | B2* | 7/2021 | Noda ................. G02B 7/04 |
| 11,520,117 | B2 | 12/2022 | Kishimoto et al. |
| 2003/0184877 | A1 | 10/2003 | Kabe |
| 2010/0060781 | A1 | 3/2010 | Yumiki |
| 2013/0070150 | A1* | 3/2013 | Yumiki ............ H04N 23/673 |
| | | | 359/689 |
| 2013/0148954 | A1 | 6/2013 | Uehara et al. |
| 2019/0258022 | A1 | 8/2019 | Nagaoka |
| 2020/0218030 | A1 | 7/2020 | Kishimoto et al. |
| 2021/0181458 | A1 | 6/2021 | Shimizu et al. |
| 2022/0075140 | A1 | 3/2022 | Nagaoka |

FOREIGN PATENT DOCUMENTS

| | | |
|---|---|---|
| JP | H09-159897 A | 6/1997 |
| JP | 2000292674 A | 10/2000 |
| JP | 2003177297 A | 6/2003 |
| JP | 2003295031 A | 10/2003 |
| JP | 2008145725 A | 6/2008 |
| JP | 2010-092031 A | 4/2010 |
| JP | 2010175961 A | 8/2010 |
| JP | 2012150368 A | 8/2012 |
| JP | 2013210421 A | 10/2012 |
| JP | 2013120357 A | 6/2013 |
| JP | 2015127729 A | 7/2015 |
| JP | 2019144319 A | 8/2019 |
| WO | 2019064946 A1 | 4/2019 |
| WO | 2020003921 A1 | 1/2020 |
| WO | 2020137563 A1 | 7/2020 |

OTHER PUBLICATIONS

Office Action issued in corresponding application No. JP2020-156451 dated Mar. 28, 2024.

* cited by examiner

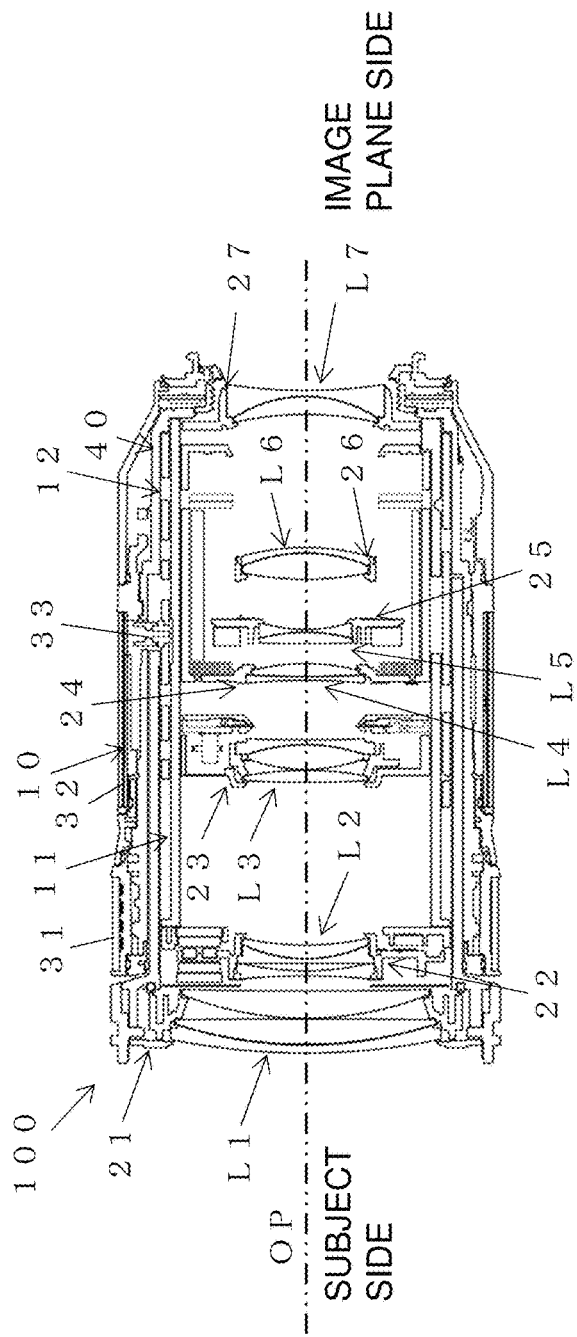
FIG. 3A Wide
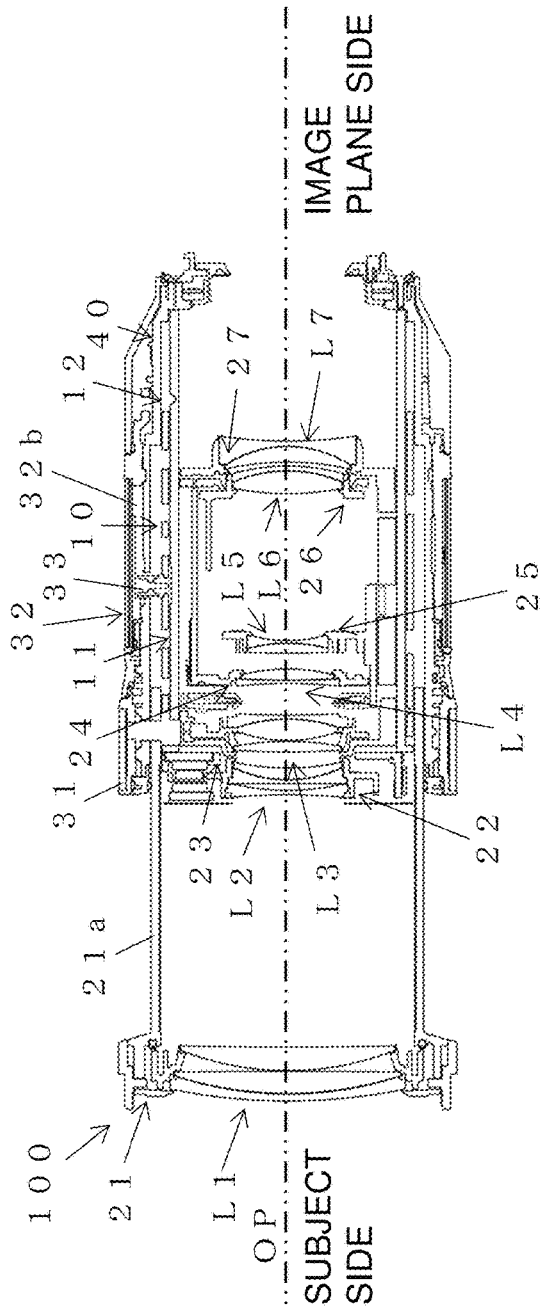
FIG. 3B Tele

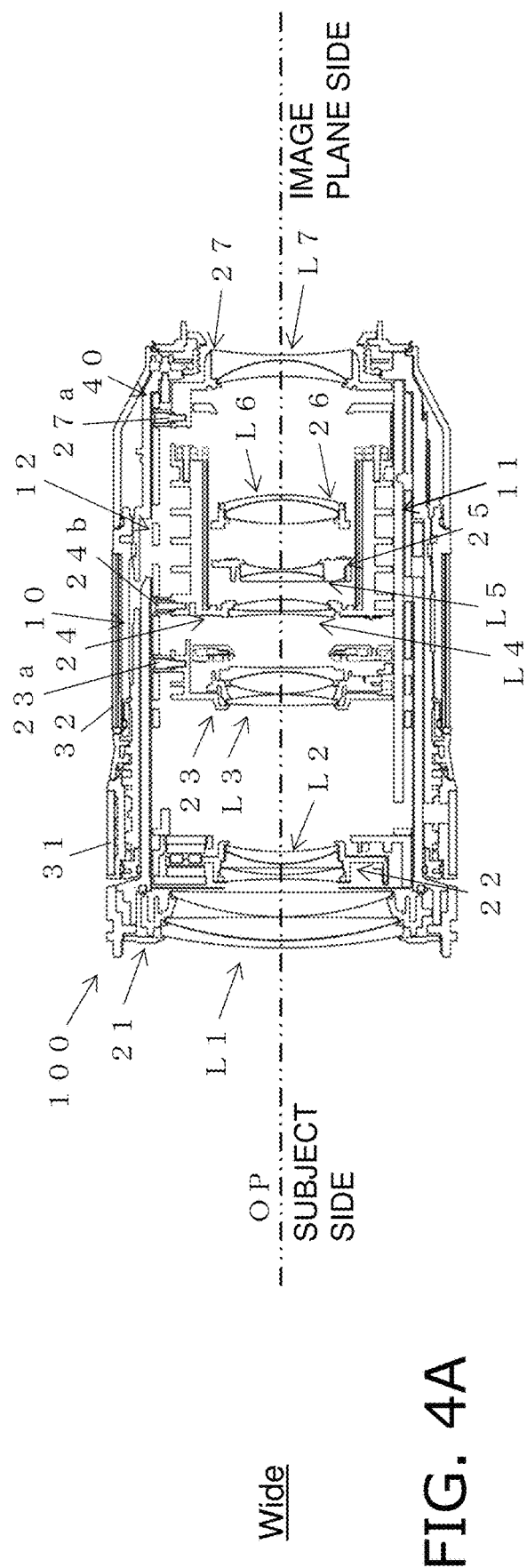
FIG. 4A Wide
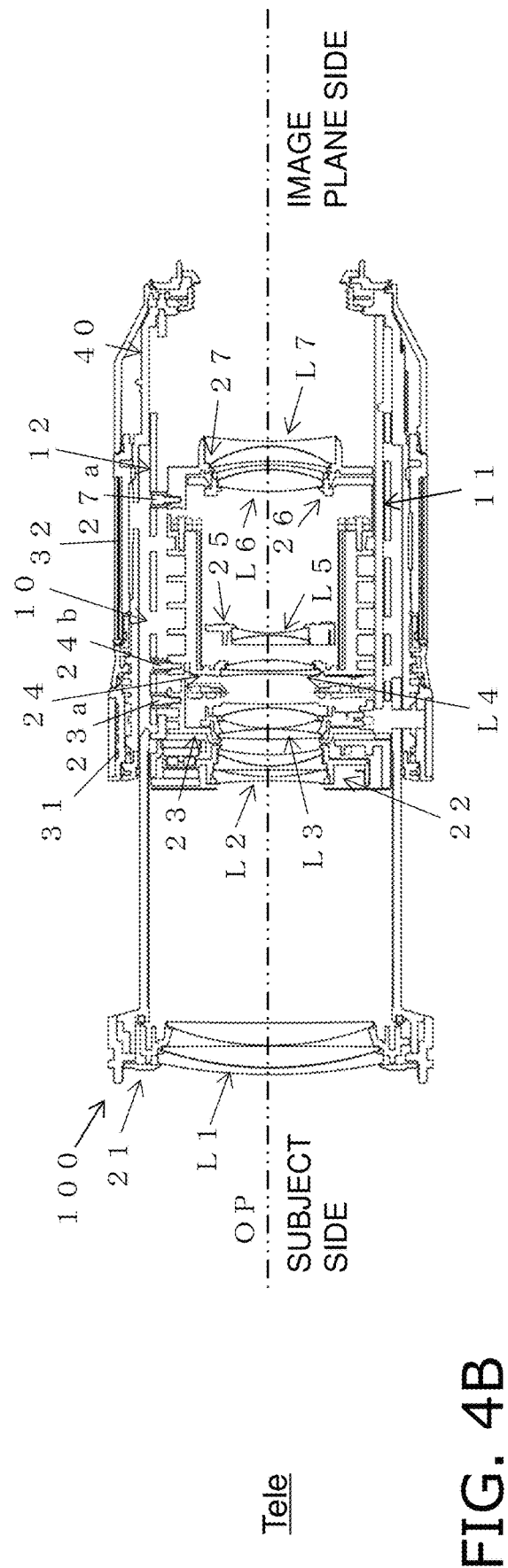
FIG. 4B Tele

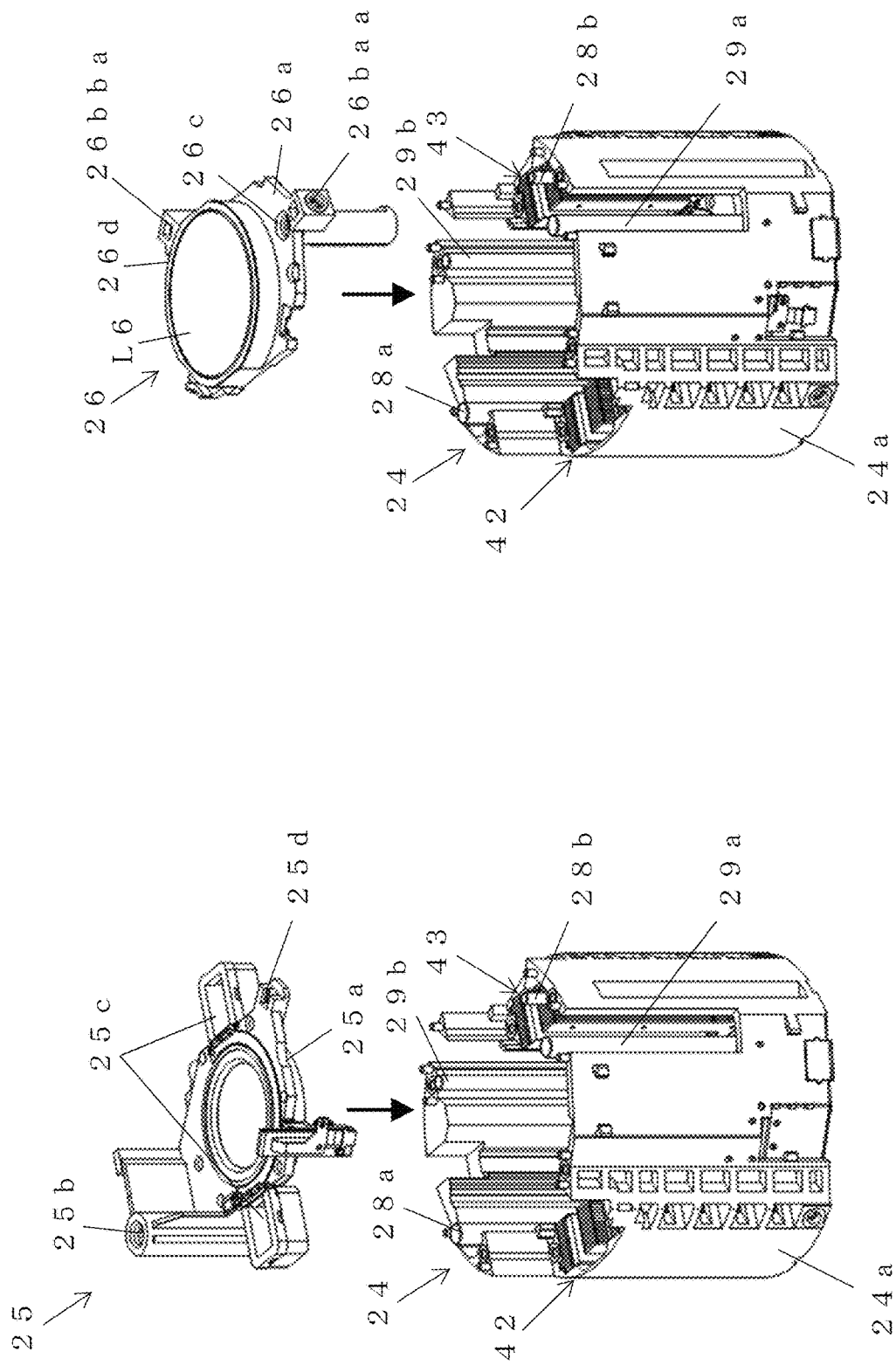

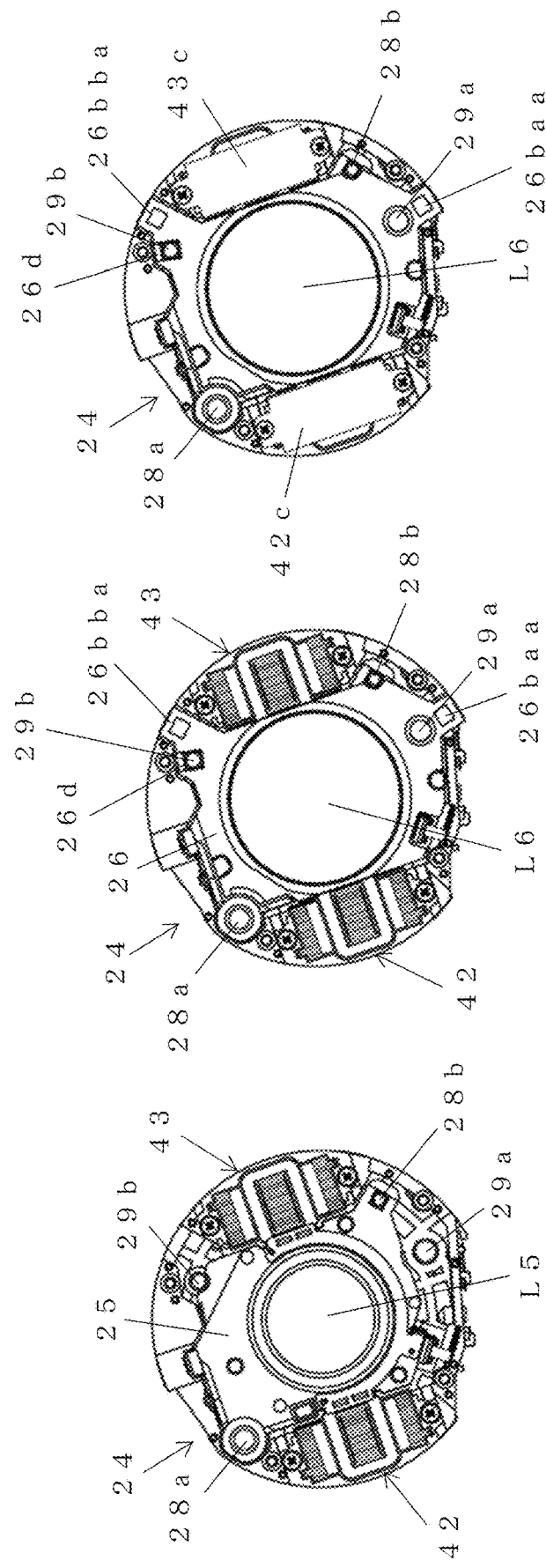

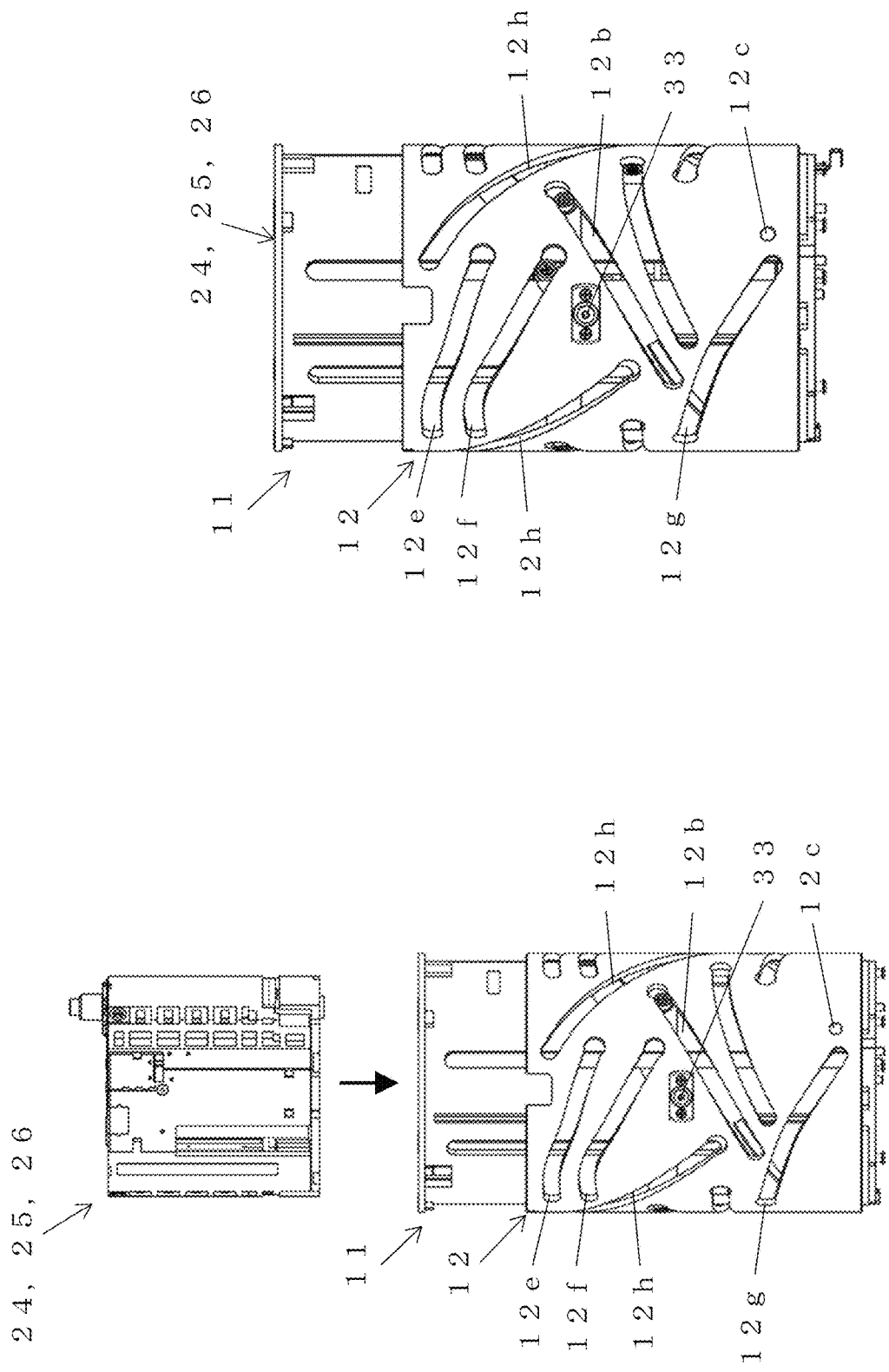

LENS SUPPORT MECHANISM, AND LENS BARREL AND CAMERA PROVIDED WITH THE LENS SUPPORT MECHANISM

CROSS-REFERENCE TO RELATED APPLICATIONS

This application claims priority to Japanese Patent Application No. 2020-156451 filed on Sep. 17, 2020. The entire disclosure of Japanese Patent Application No. 2020-156451 is hereby incorporated herein by reference.

BACKGROUND OF THE INVENTION

Technical Field

The present disclosure relates to a lens support mechanism included in a lens barrel mounted on a camera body, and to a lens barrel and a camera equipped with this lens support mechanism.

Description of the Related Art

A lens barrel mounted to a camera body comprises a plurality of frame bodies that support an optical system. A first frame body included in the plurality of frame bodies has a cam member, and a second frame body has a guide groove that slides with the cam member inserted therein.

When the first and second frames rotate relative to each other, the cam member is guided by the guide groove, and the two frames move relative to each other in the optical axis direction, thereby realizing a retractable lens barrel.

For example, Patent Literature 1 discloses a lens barrel for a zoom lens optical system having at least four movable lens groups in order to provide a highly accurate and compact zoom lens barrel, wherein the configuration is such that two sliding frames, namely, a sliding frame used for the first to third lens groups and a sliding frame used for the fourth lens group, are fitted inside a fixed cylinder, cam followers are provided to these two sliding frames, the cam cylinder imparts a specific movement to each sliding frame, the second lens group frame is moved within the sliding frame used for the first to third lens groups in conjunction with the drive of the cam cylinder, zooming is performed by imparting movement equal to the difference in the amounts of movement between the sliding frame used for the first to third lens groups and the second lens group frame, and the movement mechanism of the second lens group frame is also used for focusing.

CITATION LIST

Patent Literature

Patent Literature 1: JP-A H3-98007
Patent Literature 2: JP-A 2010-92031
Patent Literature 3: JP-A H9-159897

SUMMARY

Problem to be Solved by the Invention

However, conventional configuration described above, zooming and focusing are both performed by the moving mechanism of the second lens group frame, which gives a highly accurate and compact zoom lens barrel, but with a configuration in which a plurality of actuators are provided for driving the focus lens, for example, there is a risk that cam followers and other such parts that move in the optical axis direction will interfere with the actuators and preventing their operation.

It is an object of the present disclosure to provide a lens support mechanism that affords greater latitude in design and allows for a smaller size than in the past, as well as a lens barrel and a camera comprising this lens support mechanism.

Means for Solving Problem

The lens support mechanism according to the present disclosure comprises a first lens group unit, a second lens group unit, a substantially cylindrical fixed cylinder, a substantially cylindrical cam cylinder, and a guide shaft. The first lens group unit has a first lens group, a first main body portion that supports the first lens group, and a first cam follower that protrudes outward from the outer peripheral surface of the first main body portion in the radial direction centered on the optical axis of the first lens group. The second lens group unit has a second lens group, a second main body portion that supports the second lens group, one or two second cam followers that protrude outward from the outer peripheral surface of the second main body portion in the radial direction centered on the optical axis of the second lens group, and a first insertion opening provided so as to pass through the second main body portion along the optical axis direction. The substantially cylindrical fixed cylinder has a rotation restricting portion that is provided on the outer peripheral side of the first lens group unit and the second lens group unit and into which the first cam follower is inserted to restrict the rotation of the first lens group unit. The substantially cylindrical cam cylinder has formed therein a first cam groove and a second cam groove in which the first cam follower and the second cam follower are engaged, and rotates with respect to the fixed cylinder to move the first lens group unit and the second lens group unit in the optical axis direction. The guide shaft is a rod-shaped member having a first end portion and a second end portion on the opposite side from the first end portion, the first end portion being fixed to the first lens group unit, and is inserted into the first insertion opening and guides the second lens group unit in the optical axis direction.

Effects

The lens support mechanism according to the present disclosure affords greater latitude in design and allows for a smaller size than in the past.

BRIEF DESCRIPTION OF DRAWINGS

FIG. 3A is a cross-sectional view of a state in which the lens barrel of FIG. 2 is in the wide-angle position;

FIG. 3B is a cross-sectional view showing a state in which the lens barrel of FIG. 2 is in the telephoto position;

FIG. 4A is a cross-sectional view showing a state in which the cam followers of the third, fourth, and seventh lens group units at the wide-angle position in FIG. 3A are engaged with a cam groove of a cam cylinder;

FIG. 4B is a cross-sectional view of a state in which the cam followers of the third, fourth, and seventh lens group units at the telephoto position in FIG. 3B are engaged with a cam groove of the cam cylinder;

FIG. 13A is an oblique view of a state in which the fifth lens group unit is inserted on the inner peripheral surface side of the fourth lens group unit;

FIG. 13B is an oblique view of a state in which the sixth lens group unit is inserted on the inner peripheral surface side of the fourth lens group unit;

FIG. 15A is a plan view of a state in which the main yoke and the fifth lens group unit are inserted on the inner peripheral surface side of the fourth lens group unit;

FIG. 15B is a plan view of a state in which the sixth lens group unit is inserted on the inner peripheral surface side of the fourth lens group unit;

FIG. 15C is a plan view of a state in which the side yoke is attached to the inner peripheral surface side of the fourth lens group unit;

FIG. 17A is a side view of a state in which the fourth, fifth, and sixth lens group units are inserted on the inner peripheral surface side of the rectilinear cylinder;

FIG. 17B is a side view of a state in which the fourth, fifth, and sixth lens group units are inserted on the inner peripheral surface side of the rectilinear cylinder;

DETAILED DESCRIPTION OF THE EMBODIMENT

Embodiments pertaining to this disclosure will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 100 including a lens support mechanism 10 according to an embodiment of the present disclosure will now be described with reference to FIGS. 1 to 18B.

(1) Configuration of Lens Barrel 100

Figure 1:
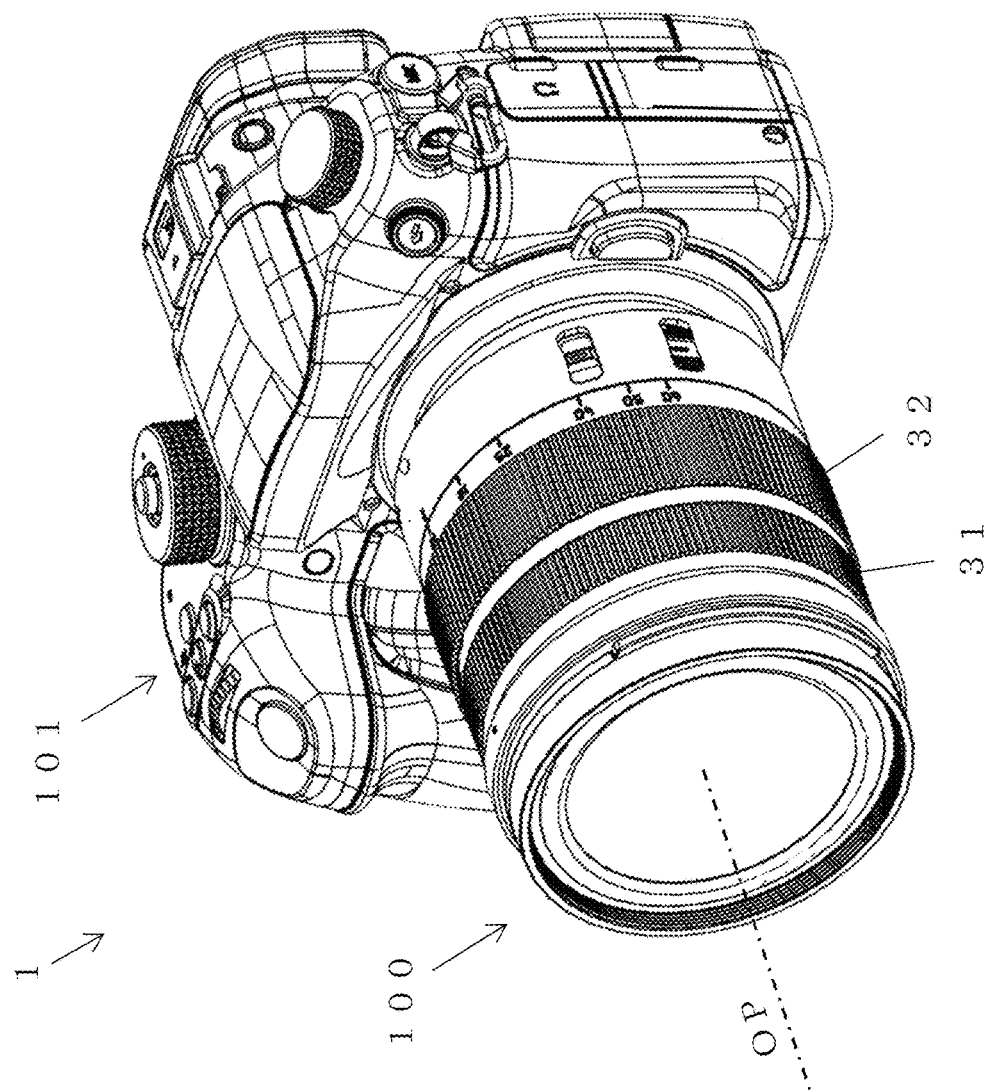
FIG. 1 is an oblique view of the configuration of a camera in which a lens barrel including a lens support mechanism according to an embodiment of the present disclosure is attached to a camera body.

The configuration of the lens barrel 100 including the lens support mechanism 10 according to an embodiment of the present disclosure will now be described with reference to the drawings. FIG. 1 is an oblique view of a camera 1 in which the lens barrel 100 including the lens support mechanism 10 according to this embodiment is mounted on a camera body 101.

As shown in FIG. 1, the lens barrel 100 is a retractable lens barrel that is detachably attached to the camera body 101.

Figure 2:
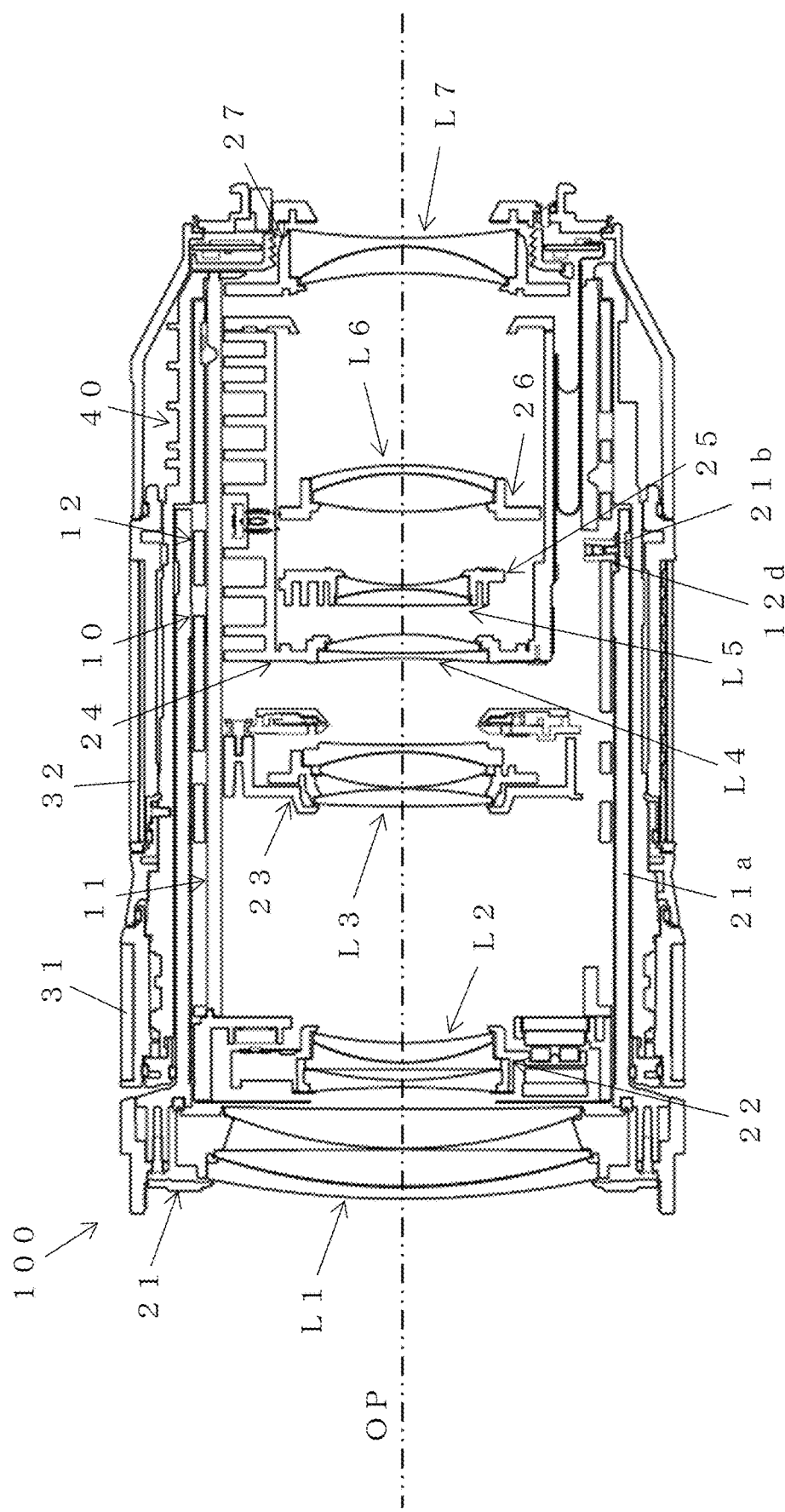
FIG. 2 is a cross-sectional view of the lens barrel in FIG. 1.

As shown in FIG. 2, the lens barrel 100 mainly comprises a rectilinear cylinder (fixed cylinder) 11, a cam cylinder 12, a first lens group unit 21, a second lens group unit 22, a third lens group unit 23, a fourth lens group unit ("first lens group unit" as claimed) 24, a fifth lens group unit ("third lens group unit" as claimed) 25, a sixth lens group unit ("second lens group unit" as claimed) 26, a seventh lens group unit 27, a focus ring 31, a zoom ring 32, and base frame 40.

The lens barrel 100 also comprises the lens support mechanism 10, which includes the rectilinear cylinder 11 and the cam cylinder 12. The detailed configuration of the lens support mechanism 10 will be described in detail below.

The first lens group unit 21 is a substantially cylindrical member disposed on the outer peripheral surface side of the rectilinear cylinder 11, and holds a first lens group lens L1 at the end on the subject side in the optical axis OP direction as shown in FIG. 2. The first lens group unit 21 is disposed closest to the subject in the optical axis OP direction of the lens barrel 100.

As shown in FIG. 2, the first lens group unit 21 has a substantially cylindrical main body portion 21a and a cam follower 21b provided to the inner peripheral surface of the substantially cylindrical main body portion 21a.

The cam follower 21b of the first lens group unit 21 is provided so as to protrude radially inward from the inner peripheral surface, near the end portion on the image plane side on the inner peripheral surface of the substantially cylindrical main body portion 21a. The cam follower 21b is engaged with a rectilinear groove 11d (see FIG. 8) formed in the rectilinear cylinder 11, and a cam groove 12d (see FIG. 9A) formed in the cam cylinder 12, and moves the first lens group unit 21 back and forth in the optical axis OP direction along with the rotation of the cam cylinder 12.

The second lens group unit 22 is a substantially annular member included on the inner peripheral surface side of the rectilinear cylinder 11, and holds a second lens group lens L2 as shown in FIG. 2. The second lens group unit 22 is disposed between the first lens group unit 21 and the third lens group unit 23 in the optical axis OP direction of the lens barrel 100. The second lens group unit 22 is fixed to the end surface on the subject side of the rectilinear cylinder 11 with screws (not shown).

The third lens group unit 23 is a substantially annular member included on the inner peripheral surface side of the rectilinear cylinder 11, and holds a third lens group lens L3 as shown in FIG. 2. The third lens group unit 23 is disposed between the second lens group unit 22 and the fourth lens group unit 24 in the optical axis OP direction of the lens barrel 100.

The third lens group unit 23 has a cam follower 23a (see FIG. 4A) provided so as to protrude radially outward from the outer peripheral surface.

The fourth lens group unit ("first lens group unit" as claimed) 24 is a substantially cylindrical member included on the inner peripheral surface side of the rectilinear cylinder 11, and holds the fourth lens group lens ("first lens group" as claimed) L4 as shown in FIG. 2. The fourth lens group unit 24 is disposed between the third lens group unit 23 and the fifth lens group unit 25 in the optical axis OP direction of the lens barrel 100.

Figure 5:
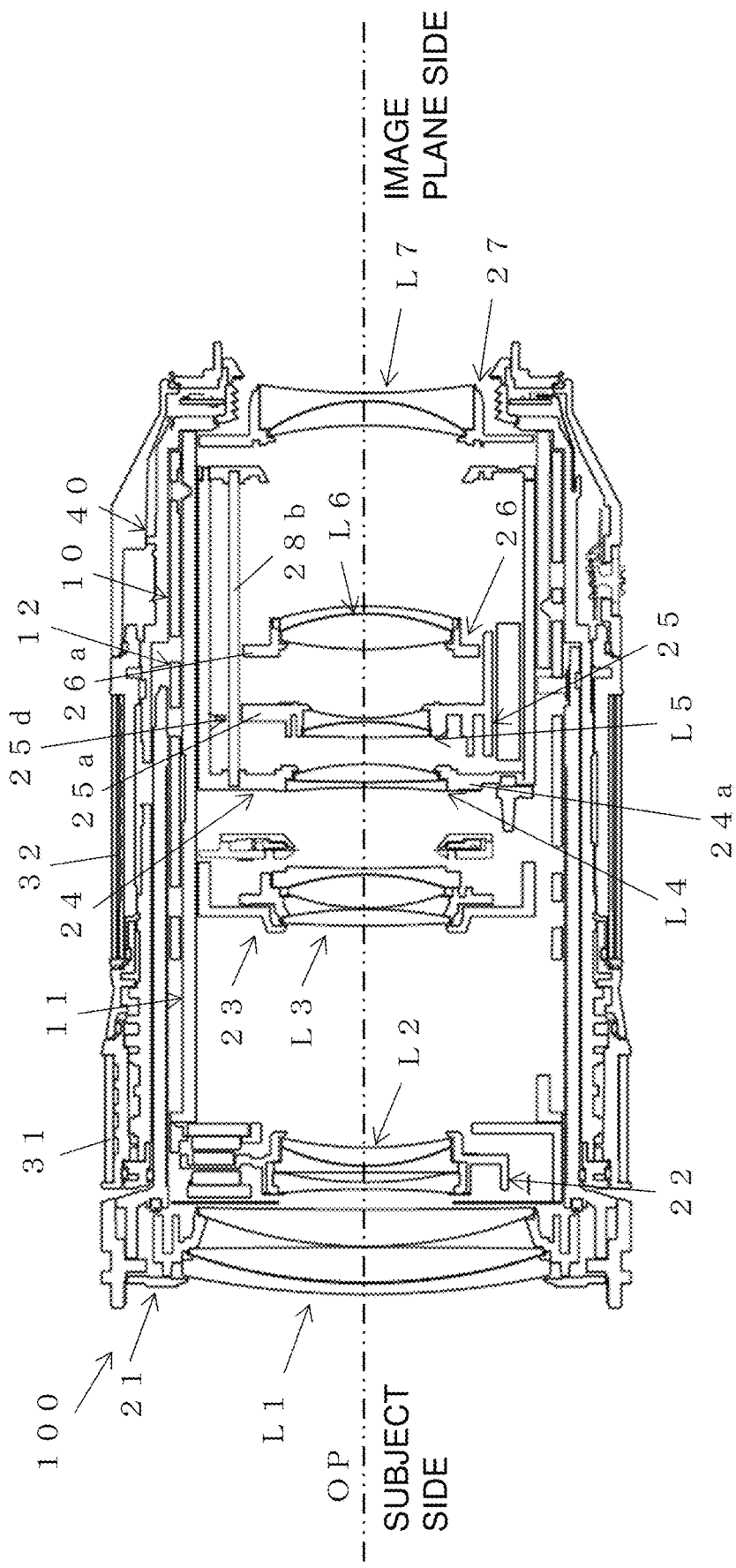
FIG. 5 is a cross-sectional view of a state in which a sub-guide shaft is inserted into an insertion opening of a fifth lens group unit at the wide-angle position in FIG. 3A.
Figure 6:
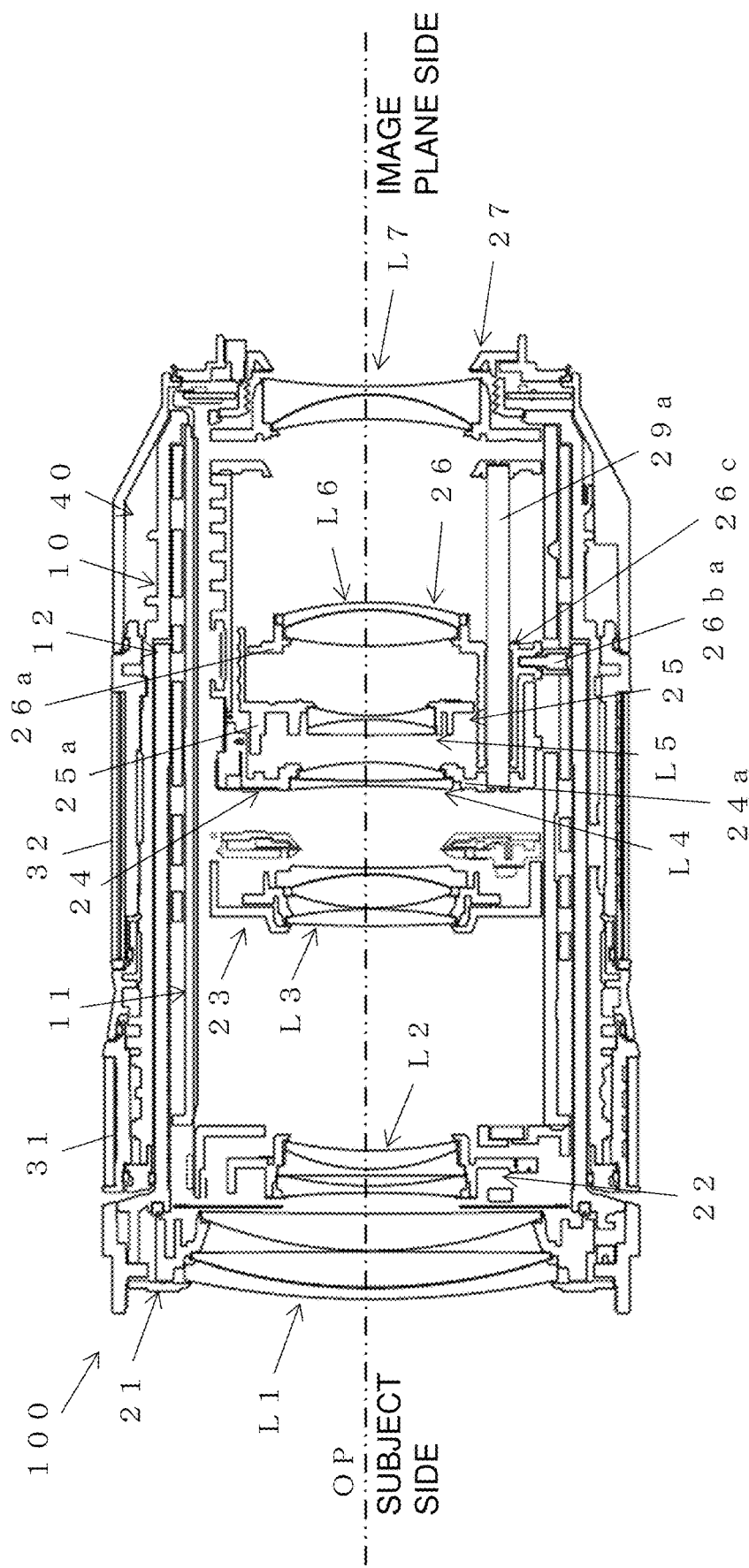
FIG. 6 is a cross-sectional view of a state in which a cam follower of a sixth lens group unit at the wide-angle position in FIG. 3A is engaged with a cam groove of the cam cylinder.
Figure 11:
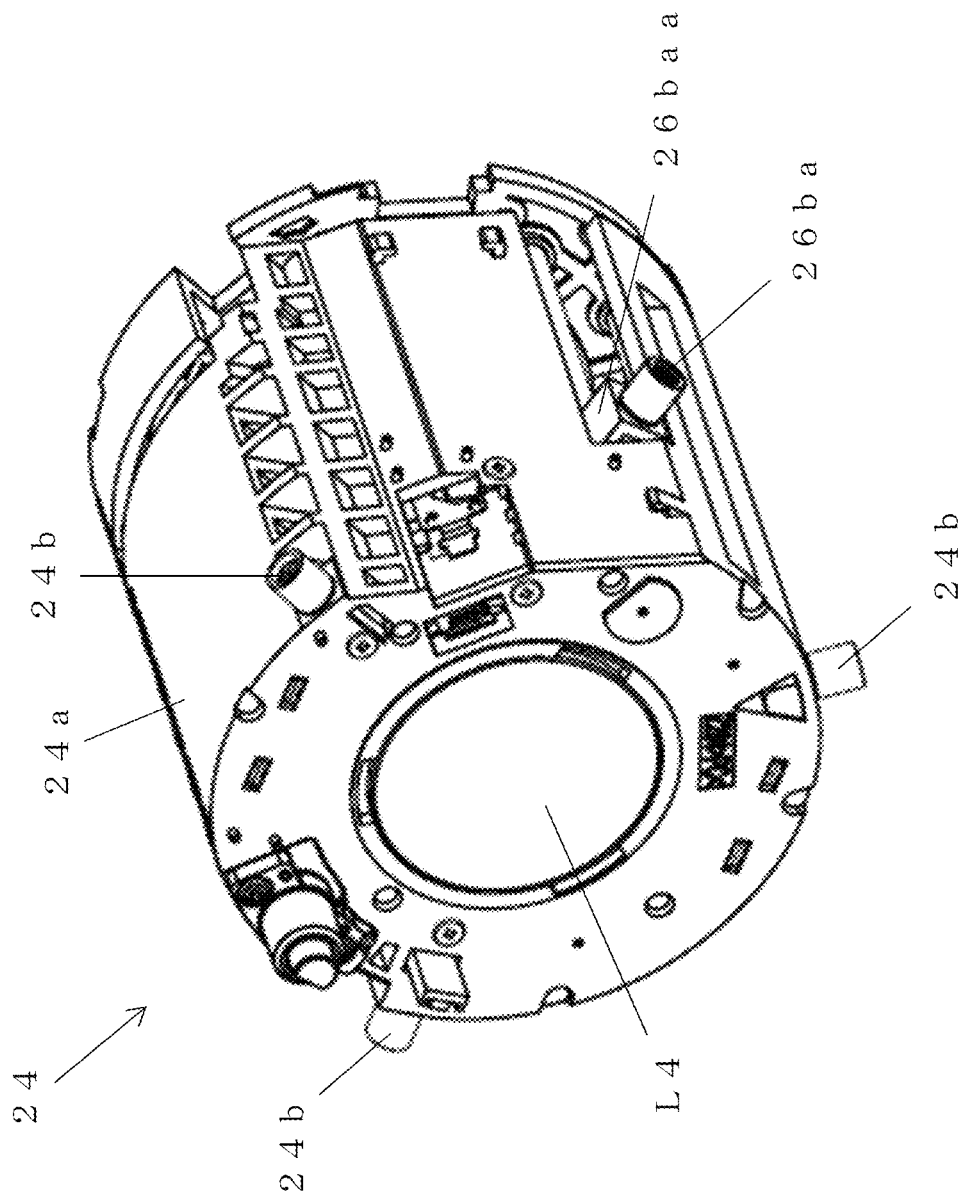
FIG. 11 is an oblique view of the configuration of the fourth lens group unit.

As shown in FIG. 5, the fourth lens group unit 24 has a substantially cylindrical main body portion ("first main body portion" as claimed) 24a and three cam followers 24b ("first cam followers" as claimed) provided so as to protrude radially outward from the outer peripheral surface of the main body portion 24a (see FIGS. 4A and 11).

Figure 19:
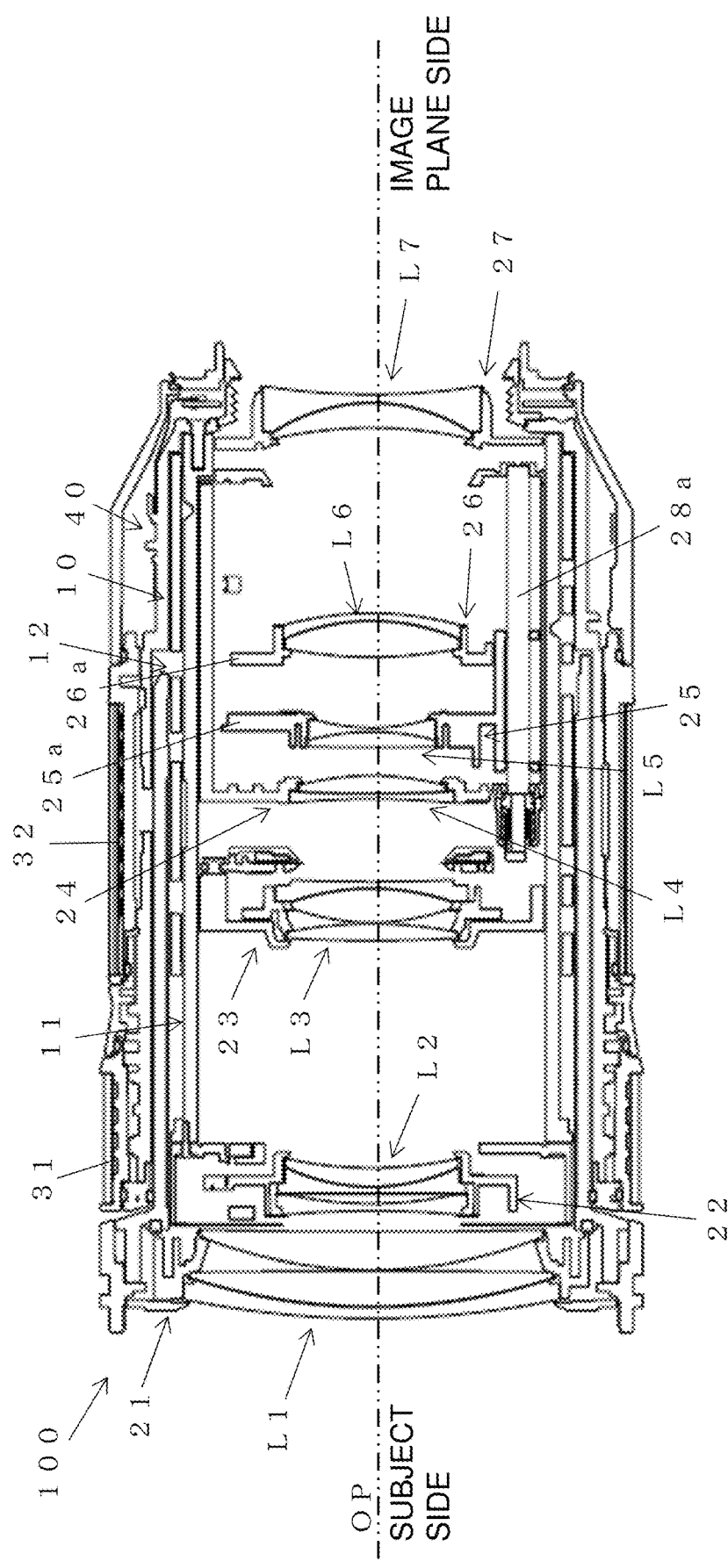
FIG. 19 is a cross-sectional view of a state in which a guide shaft is inserted into an insertion opening of the fifth lens group unit at the wide-angle position in FIG. 3A.

The fifth lens group unit ("third lens group unit" as claimed) 25 is a substantially annular member included on the inner peripheral surface side of the rectilinear cylinder 11, and holds the fifth lens group lens ("third lens group unit" as claimed) L5 as a focus lens, as shown in FIG. 2. The fifth lens group unit 25 is disposed between the fourth lens group unit 24 and the sixth lens group unit 26 in the optical axis OP direction of the lens barrel 100. The fifth lens group unit 25 is attached to the fourth lens group unit 24 in suspended state by a guide shaft 28a (see FIGS. 13A and 19) that is attached at one end to the fourth lens group unit 24, and the fifth lens group unit 25 is driven in the optical axis OP direction by actuators 42 and 43 (discussed below; see FIG. 7).

As shown in FIG. 13A, the fifth lens group unit 25 has a substantially annular main body portion ("third main body portion" as claimed) 25a, an insertion opening ("second insertion opening" as claimed) 25b that is formed in the main body portion 25a and into which the guide shaft 28a is inserted, a coil 25c, and an insertion opening 25d.

The sixth lens group unit ("second lens group unit" as claimed) 26 is a substantially annular member included on the inner peripheral surface side of the rectilinear cylinder 11, and holds the sixth lens group lens ("second lens group" as claimed) L6 as shown in FIG. 2. The sixth lens group unit 26 is disposed between the fifth lens group unit 25 and the seventh lens group unit 27 in the optical axis OP direction of the lens barrel 100. Like the fifth lens group unit 25, the sixth lens group unit 26 is attached to the fourth lens group unit 24 in a suspended state by a guide shaft 29a (see FIG. 6) attached at one end to the fourth lens group unit 24.

As shown in FIG. 5, the sixth lens group unit 26 has a substantially annular main body portion ("second main body portion" as claimed) 26a, a main cam follower ("second cam follower" as claimed) 26ba (see FIG. 6), a reinforcing cam follower 26bb, an insertion opening ("first insertion opening" as claimed) 26c, and a recess 26d (see FIG. 15B, etc.).

Figure 20A:
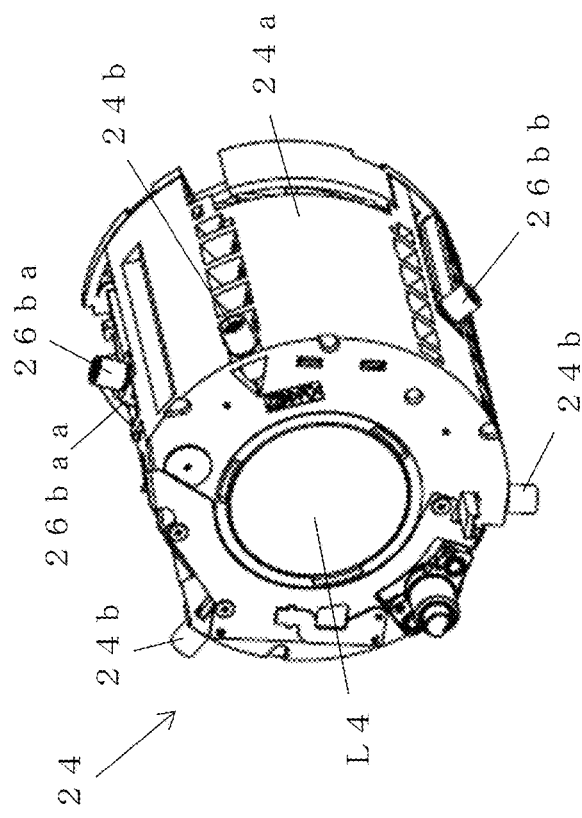
FIG. 20A is an oblique view of a main cam follower and a reinforcing cam follower of the sixth lens group unit protruding from the outer peripheral surface of the fourth lens group unit.
Figure 20B:
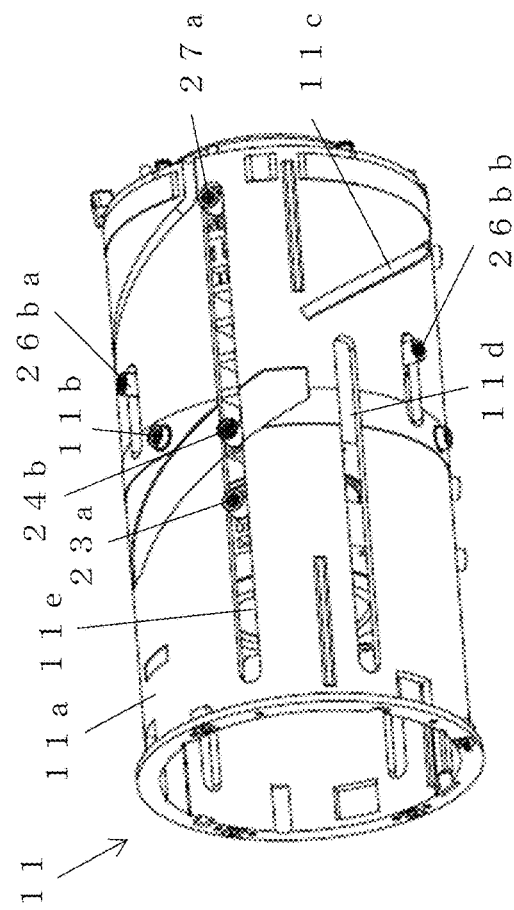
FIG. 20B is an oblique view of a main cam follower and a reinforcing cam follower of the sixth lens group unit protruding from the outer peripheral surface of the rectilinear cylinder.

The main cam follower ("second cam follower" as claimed) 26ba (see FIG. 6) and the reinforcing cam follower 26bb (see FIGS. 20A and 20B) are formed so as to protrude radially outward from the outer peripheral surface of the main body portion 26a. The main cam follower 26ba and the reinforcing cam follower 26bb respectively engage with the cam grooves 12h and 12i (see FIGS. 9A and 9B) formed in the cam cylinder 12.

The insertion opening ("first insertion opening" as claimed) 26c is formed in the main body portion 26a, and the guide shaft 29a is inserted therein. Consequently, the movement of the sixth lens group unit 26 in the rotation direction around the optical axis OP is restricted by the guide shaft 29a.

A sub-guide shaft 29b that restricts the movement of the sixth lens group unit 26 in the rotation direction around the guide shaft 29a is inserted into the recess 26d. Consequently, the movement of the sixth lens group unit 26 in the rotation direction around the guide shaft 29a is restricted by the sub-guide shaft 29b.

The seventh lens group unit 27 is a substantially annular member included on the inner peripheral surface side of the rectilinear cylinder 11, and holds the seventh lens group lens L7 as shown in FIG. 2. The seventh lens group unit 27 is disposed closest to the image plane side, which is on the opposite side from the subject side in the optical axis OP direction of the lens barrel 100.

The seventh lens group unit 27 has a cam follower 27a (see FIG. 4A) provided so as to protrude radially outward from the outer peripheral surface.

Here, the first to seventh lens group lenses L1 to L7 held by the first to seventh lens group units 21 to 27 are disposed in that order starting from the subject side, with the optical axis OP as the center axis. In the lens barrel 100, the rotational operation of the zoom ring 32 (discussed below) moves the first and the third to seventh lens group units 21 and 23 to 27 back and forth along the optical axis OP direction between the wide-angle position shown in FIG. 3A and the telephoto position shown in FIG. 3B.

That is, the lens barrel 100 is configured such that when the zoom ring 32 attached in a rotatable state to the outer peripheral surface of the base frame 40 is rotated, the cam cylinder 12 rotates along with the rotation of the zoom ring 32. In the lens barrel 100, when the cam cylinder 12 rotates, the first and the third to seventh lens group units 21 and 23 to 27 are driven back and forth in the optical axis OP direction.

As shown in FIG. 4A, the first, third, fourth, and seventh lens group units 21, 23, 24, and 27 have a plurality of cam followers (cam followers 21b, 23a, 24b, and 27a) that respectively engage with a plurality of cam grooves formed in the cam cylinder 12. Also, the cam follower 21b of the first lens group unit 21 engages with the rectilinear groove 11d formed in the rectilinear cylinder 11. Also, the cam followers 23a, 24b, and 27a of the third, fourth, and seventh lens group units 23, 24, and 27 engage with the rectilinear groove 11e formed in the rectilinear cylinder 11.

In addition, the cam follower 21b of the first lens group unit 21 engages with the cam groove 12d formed in the cam cylinder 12. Also, the cam followers 23a, 24b, and 27a of the third, fourth, and seventh lens group units 23, 24, and 27 engage with the cam grooves 12e, 12f, and 12g formed in the cam cylinder 12.

Consequently, when the cam cylinder 12 is rotated with respect to the rectilinear cylinder 11, the first, third, fourth, and seventh lens group units 21, 23, 24, and 27 are driven back and forth in the OP optical axis direction relative to each other, between the wide-angle position shown in FIG. 4A and the telephoto position shown in FIG. 4B.

Figure 7:
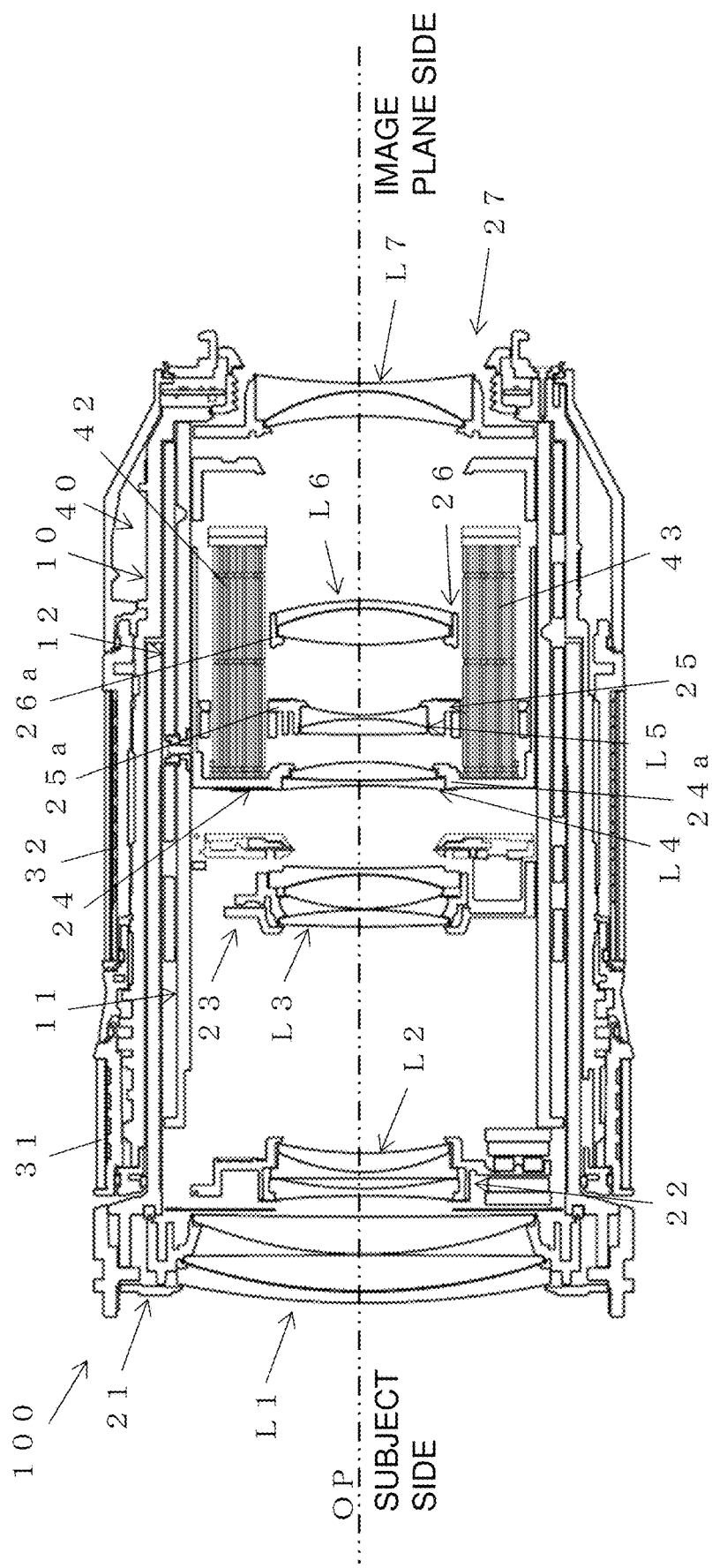
FIG. 7 is a cross-sectional view of two actuators that drive the fifth lens group unit and the sixth lens group unit back and forth in the optical axis direction at the wide-angle position in FIG. 3A.

Also, as shown in FIG. 7, two actuators 42 and 43 are attached on the inner peripheral surface side of the fourth lens group unit 24 included in the lens barrel 100.

Figure 12B:
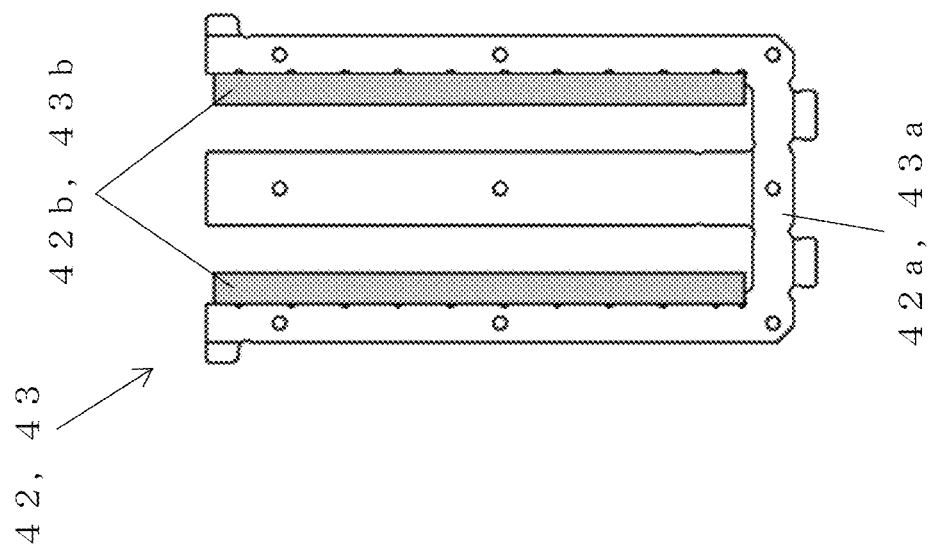
FIG. 12B is a side view of the configuration of an actuator inserted into the fourth lens group unit.
Figure 12A:
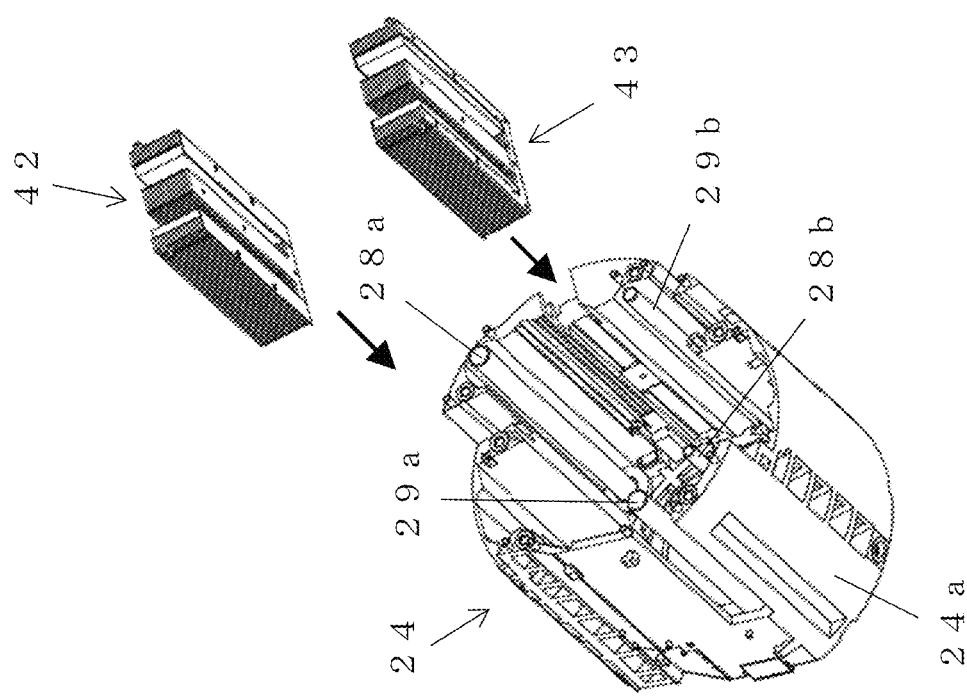
FIG. 12A is an oblique view of a state in which two actuators are inserted into the fourth lens group unit.

As shown in FIGS. 12A and 12B, the two actuators 42 and 43 are configured to include main yokes 42a and 43a, magnets 42b and 43b, side yokes 42c and 43c, etc., and drive the fifth lens group unit 25 back and forth in the optical axis direction with respect to the fourth lens group unit 24.

Consequently, an autofocus function can be realized by driving the fifth lens group unit 25, including the fifth lens group lens L5 used as the focus lens, back and forth in the optical axis direction.

(2) Configuration of Lens Support Mechanism 10

Next, the configuration of the lens support mechanism 10 in this embodiment will be described in detail.

As shown in FIG. 2 and the like, the lens support mechanism 10 comprises the rectilinear cylinder 11, the cam cylinder 12, the fourth lens group unit 24, the sixth lens group unit 26, and the guide shaft 29a.

Figure 8:
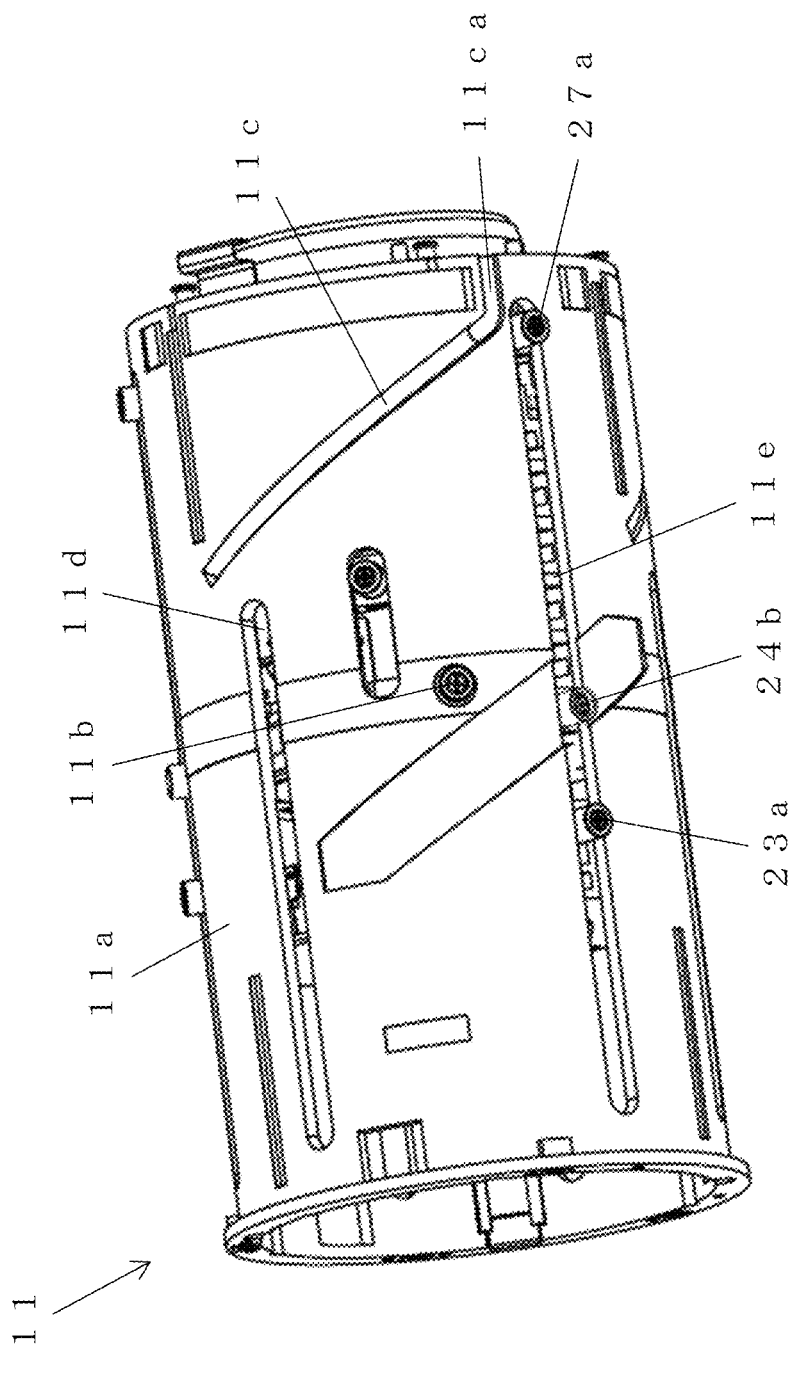
FIG. 8 is an oblique view of a state in which the cam followers of the lens group units disposed on the inner peripheral surface side of the rectilinear cylinder of the lens support mechanism included in the lens barrel in FIG. 2 are engaged in a groove of the rectilinear cylinder.

As shown in FIG. 8, the rectilinear cylinder 11 has a substantially cylindrical main body portion 11a, a main cam follower 11b, a sub-cam groove 11c, and rectilinear grooves 11d and 11e. FIG. 8 shows the positions of the cam followers 23a, 24b, and 27a at the wide-angle position shown in FIG. 3A, etc.

As shown in FIG. 8, the rectilinear groove 11d with which the cam follower 21b provided to the first lens group unit 21 is engaged, and the rectilinear groove 11e with which the cam followers 23a, 24b, and 27a provided to the third, fourth, and seventh lens group units 23, 24, and 27 are formed in the substantially cylindrical main body portion 11a. Three main cam followers 11b are attached in the circumferential direction near the approximate center of the outer peripheral surface of the main body portion 11a.

As shown in FIG. 8, the three main cam followers 11b are attached so as to protrude from the outer peripheral surface of the substantially cylindrical main body portion 11a.

In FIG. 8, the cam cylinder 12 is shown attached directly to the outer peripheral surface of the rectilinear cylinder 11 to facilitate description, but in the actual assembly process of the lens barrel 100, the main cam follower 11b is attached to the outer peripheral surface of the rectilinear cylinder 11 in a state in which the cam cylinder 12 has been inserted on the outer peripheral surface side of the rectilinear cylinder 11.

Figure 9A:
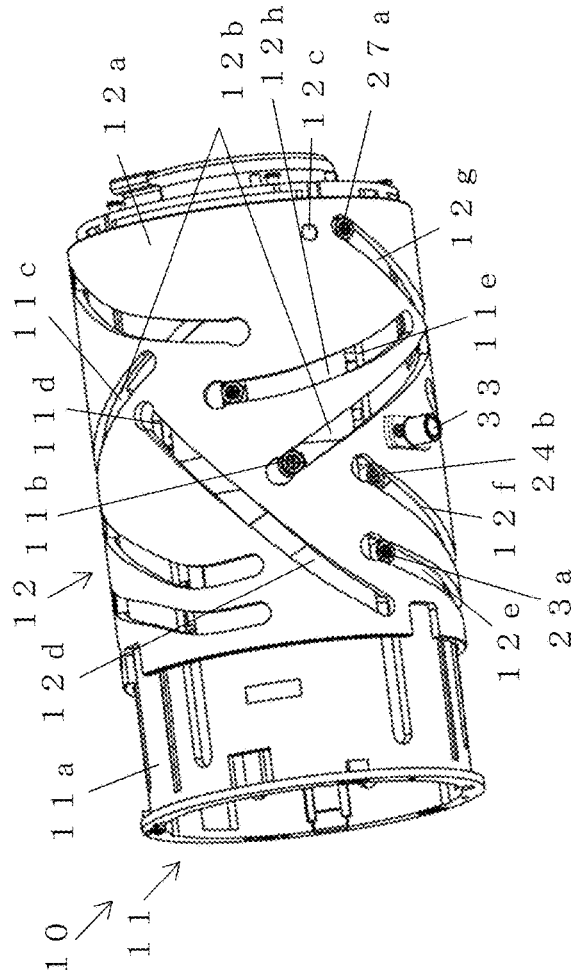
FIG. 9A is an oblique view showing the positional relation between the rectilinear cylinder in FIG. 5, the cam cylinder disposed on the outer peripheral surface side thereof, and the cam followers of the lens group units at the wide-angle position.
Figure 9B:
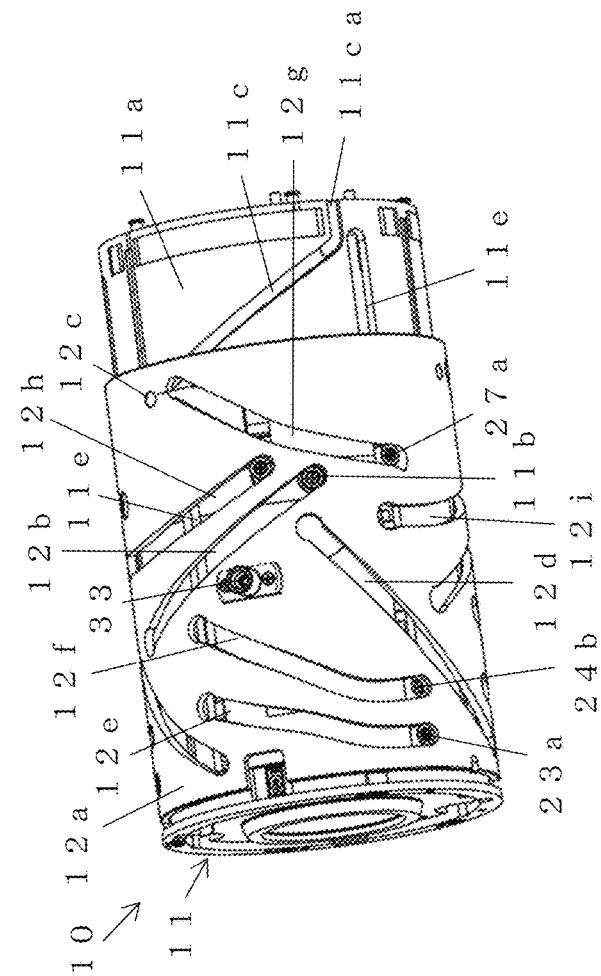
FIG. 9B is an oblique view showing the positional relation between the rectilinear cylinder in FIG. 5, the cam cylinder disposed on the outer peripheral surface side thereof, and the cam followers of the lens group units at the telephoto position.

As shown in FIGS. 9A and 9B, the main cam followers 11b engage with main cam grooves 12b formed on the cam cylinder 12 side and move along the main cam grooves 12b as the cam cylinder 12 rotates.

As shown in FIG. 8, the sub-cam groove 11c is a recess (non-through-hole) formed obliquely with respect to the optical axis OP direction, and a sub-cam follower 12c provided so as to protrude radially inward from the inner peripheral surface of the cam cylinder 12 engages with the sub-cam groove 11c with a specific gap therebetween. As shown in FIGS. 9A and 9B, the sub-cam groove 11c is formed so as to be substantially parallel to the main cam grooves 12b provided on the cam cylinder 12 side (discussed below).

Also, the sub-cam groove 11c is provided with an insertion opening 11ca in the end surface on the image plane side.

Consequently, during assembly of the lens barrel 100, the cam cylinder 12 can be inserted from the end surface on the image plane side of the rectilinear cylinder 11, and the sub-cam follower 12c can be engaged with the sub-cam groove 11c, while the sub-cam follower 12c is still attached on the inner peripheral surface side of the cam cylinder 12.

The rectilinear groove 11d is a through-hole in which the first lens group unit 21 is moved in the optical axis OP direction, and is formed in a straight line along the optical axis OP direction at a position closer to the subject side in the optical axis OP direction, as shown in FIG. 8.

The rectilinear groove 11e is a through-hole that moves the third, fourth, and seventh lens group units 23, 24, and 27 in the optical axis OP direction, and as shown in FIG. 8, the cam followers 23a, 24b, and 27a of the units 23, 24, and 27 are engaged with this groove. The rectilinear groove 11e is formed in a straight line along the optical axis OP direction over substantially the entire length of the substantially cylindrical main body portion 11a in the optical axis OP direction.

As shown in FIGS. 9A and 9B, the cam cylinder 12 is disposed on the outer peripheral surface side of the substantially cylindrical rectilinear cylinder 11 described above, and has a substantially cylindrical main body portion 12a, main cam grooves ("first cam grooves" as claimed) 12b, a sub-cam follower 12c, and cam grooves 12d, 12e, 12f, 12g, 12h, and 12i ("second cam groove" as claimed).

With the lens barrel 100 in this embodiment, the rectilinear cylinder 11 and the cam cylinder 12 are inserted on the inner peripheral surface side of the base frame 40, and the rectilinear cylinder 11 is fixed to the base frame 40 with a screw (not shown).

Consequently, as shown in FIGS. 9A and 9B, the cam cylinder 12 moves back and forth in the optical axis OP direction on the outer peripheral surface side of the rectilinear cylinder 11, which is fixed with respect to the base frame 40.

As shown in FIG. 9A, a plurality of cam grooves including the main cam grooves 12b and cam grooves 12d, 12e, 12f, 12g, 12h, and 12i are formed in the substantially cylindrical main body portion 12a.

As shown in FIGS. 9A and 9B, three main cam grooves 12b are provided near the approximate center of the substantially cylindrical main body portion 12a so as to correspond to the three main cam followers 11b provided on the rectilinear cylinder 11 side as described above. The three main cam grooves 12b are provided as substantially linear through-holes formed obliquely with respect to the optical axis OP direction.

The main cam grooves 12b do not have to be substantially linear, and may instead be formed along a free curve.

Consequently, when the cam cylinder 12 is rotated with respect to the rectilinear cylinder 11, the cam cylinder 12 is moved back and forth in the optical axis OP direction by the main cam followers 11b provided on the rectilinear cylinder 11 side moving along the main cam grooves 12b.

Also, as shown in FIG. 9A, the main cam grooves 12b are disposed at positions overlapping a part of the sub-cam groove 11c as viewed from the outer peripheral surface side.

Next, the assembly process will be explained for the fourth lens group unit 24, the fifth lens group unit 25, and the sixth lens group unit 26, which are inserted on the inner peripheral surface side of the unit in which the rectilinear cylinder 11 and the cam cylinder 12 shown in FIGS. 9A and 9B are combined.

Figure 10B:
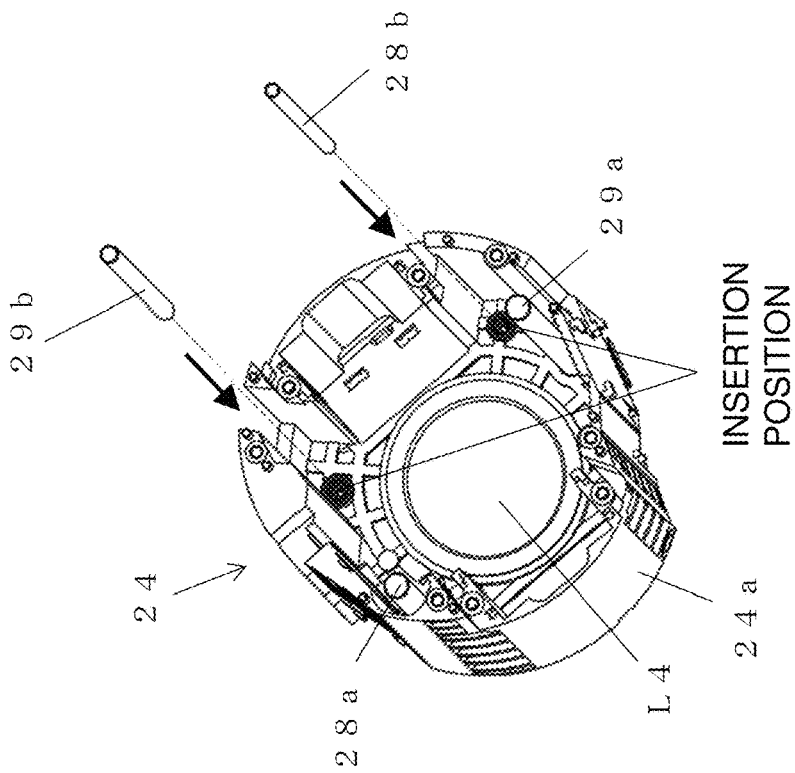
FIG. 10B is an oblique view of a state in which two sub-guide shafts are inserted into the fourth lens group unit.
Figure 10A:
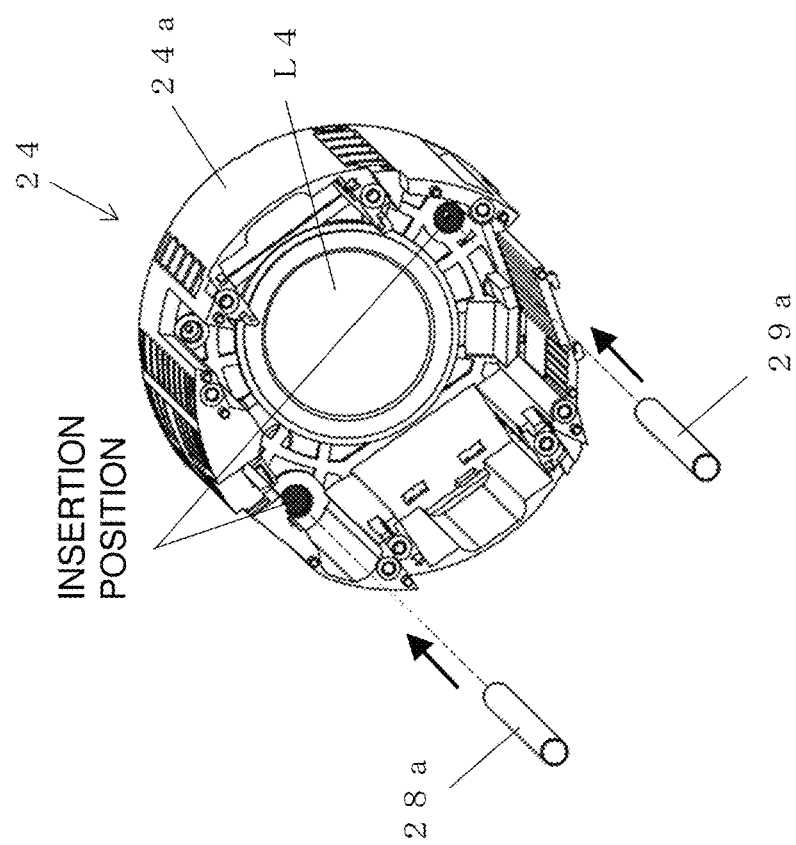
FIG. 10A is an oblique view of a state in which two main guide shafts are inserted into a fourth lens group unit.

In the fourth lens group unit 24, as shown in FIG. 10A, the guide shaft 28a used for the fifth lens group unit 25, and the guide shaft 29a used for the sixth lens group unit 26 are inserted at their respective insertion positions on the inner peripheral surface side of the substantially cylindrical main body portion 24a holding the fourth lens group lens L4. Further, in the fourth lens group unit 24, as shown in FIG. 10B, the sub-guide shaft 28b used for the fifth lens group unit 25, and the sub-guide shaft 29b used for the sixth lens group unit 26 are inserted at their respective insertion positions on the inner peripheral surface side of the substantially cylindrical main body portion 24a.

Consequently, two guide shafts 28a and 29a and two sub-guide shafts 28b and 29b used for the fifth lens group unit 25 and the sixth lens group unit 26 are disposed on the inner peripheral surface side of the main body portion 24a of the fourth lens group unit 24.

As shown in FIG. 11, the three cam followers 24b of the fourth lens group unit 24 are spaced at substantially equal angles (about 120 degrees) so as to protrude radially outward from the outer peripheral surface of the substantially cylindrical main body portion 24a.

Next, the guide shafts 28a and 29a and the sub-guide shafts 28b and 29b are disposed on the inner peripheral surface side of the main body portion 24a of the fourth lens group unit 24, after which the two actuators 42 and 43 are inserted at positions that are substantially opposite in the radial direction, as shown in FIG. 12A.

The actuators 42 and 43 are configured to include side yokes 42c and 43c (discussed below), but here, the main yokes 42a and 43a and the magnet 42b (see FIG. 12B), excluding the side yokes 42c and 43c, are inserted on the inner peripheral surface side of the main body portion 24a.

As shown in FIG. 12B, the main yokes 42a and 43a are substantially E-shaped.

As shown in FIG. 12B, the magnets 42b and 43b are attached on the inside of the end portions of the substantially E-shaped main yokes 42a and 43a.

Next, as shown in FIG. 13A, the fifth lens group unit 25, including the fifth lens group lens L5 as a focus lens, is inserted on the inner peripheral surface side of the main body portion 24a of the fourth lens group unit 24. At this point, the guide shaft 28a is inserted into the insertion opening 25b of the fifth lens group unit 25, and the sub-guide shaft 28b is inserted into the insertion opening 25d.

At this point, on the inner peripheral surface side of the main body portion 24a of the fourth lens group unit 24, as shown in FIG. 15A, the fifth lens group unit 25 is inserted between the two actuators 42 and 43 disposed opposite each other.

Consequently, the fifth lens group unit 25 is attached to the fourth lens group unit 24 in a state of being axially suspended by the guide shaft 28a or the like whose first end is fixed, and when a current is passed through the coil 25c, the fifth lens group unit 25 is driven back and forth in the optical axis OP direction by the actuators 42 and 43.

Next, as shown in FIG. 13B, the sixth lens group unit 26, including the sixth lens group lens L6, is inserted on the inner peripheral surface side of the main body portion 24a of the fourth lens group unit 24. At this point, the guide shaft 29a is inserted into the insertion opening 26c of the sixth lens group unit 26, and the sub-guide shaft 29b is inserted into the recess 26d.

At this point, on the inner peripheral surface side of the main body portion 24a of the fourth lens group unit 24, as shown in FIG. 15B, the sixth lens group unit 26 is inserted between the two actuators 42 and 43 disposed opposite each other. Cam follower fixed portions 26baa and 26bba to which the main cam follower 26ba and the reinforcing cam follower 26bb of the sixth lens group unit 26 are attached are disposed at positions offset in the circumferential direction (the planar direction in FIG. 15B) so as not to interfere with the actuators 42 and 43.

That is, as shown in FIG. 2, etc., in a state in which the fourth lens group unit 24 and the sixth lens group unit 26 are closest, the main cam follower 26ba and the reinforcing cam follower 26bb are disposed at the same (overlapping) positions in the optical axis OP direction with respect to the actuators 42 and 43, and at positions that are offset in the circumferential direction.

Furthermore, in the state where the fourth lens group unit 24 and the sixth lens group unit 26 are closest, the sixth lens group unit 26 is disposed at the same (overlapping) position in the optical axis OP direction with respect to the actuators 42 and 43, and at a position that is offset in the circumferential direction.

Consequently, the sixth lens group unit 26 is attached in a state of being axially suspended by a guide shaft 29a or the like whose first end is fixed to the fourth lens group unit 24. The sixth lens group unit 26 is then driven back and forth in the OP optical axis direction, without interfering with other parts, when the cam cylinder 12, including the cam groove 12h with which the main cam follower 26ba fixed to the cam follower fixing portion 26ba is engaged, rotates with respect to the rectilinear cylinder 11.

Figure 14B:
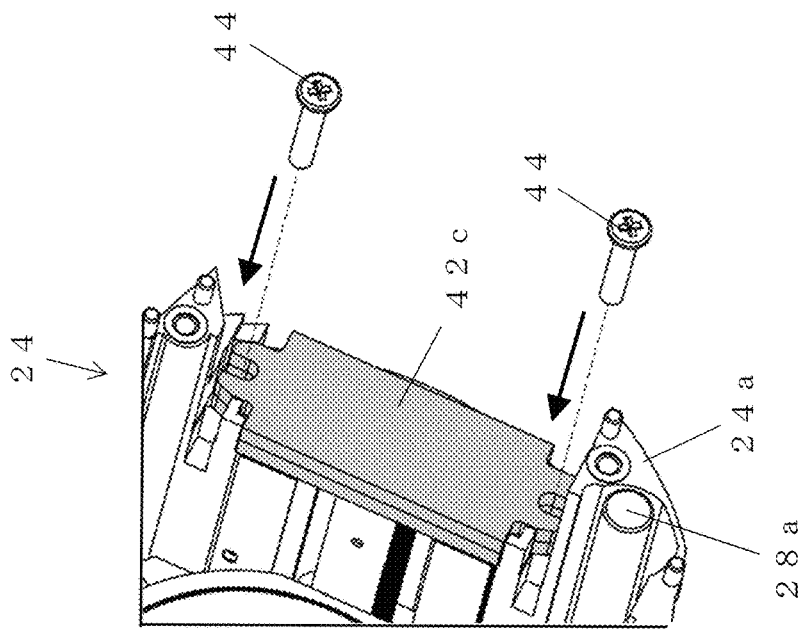
FIG. 14B is an oblique view of a state in which the side yoke attached in FIG. 14A is fixed with screws.
Figure 14A:
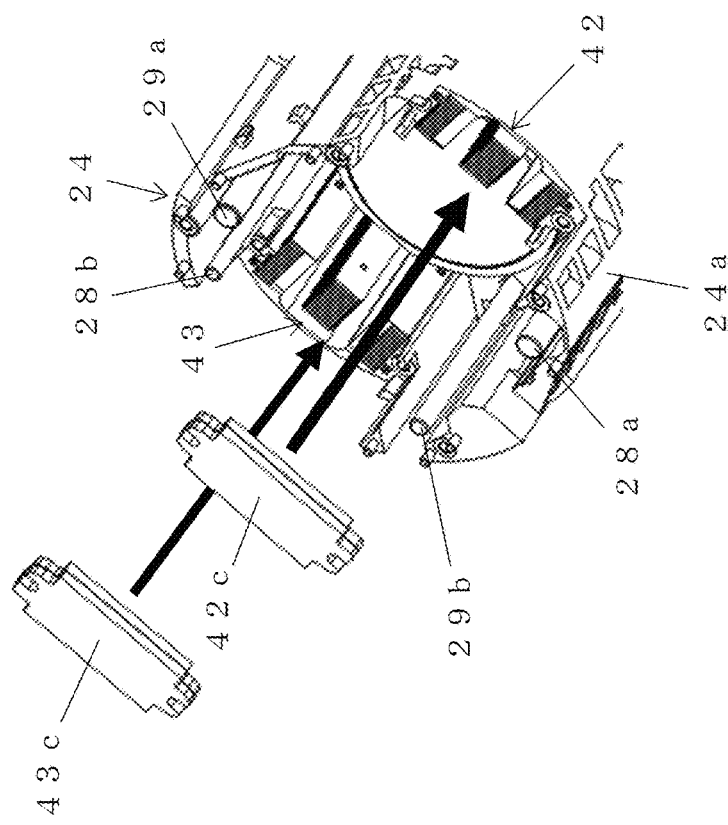
FIG. 14A is an oblique view of a state in which a side yoke is attached to a main yoke of an actuator inserted on the inner peripheral surface side of the fourth lens group unit.

Next, as shown in FIG. 14A, the side yokes 42c and 43c are inserted at the ends of the actuators 42 and 43 that have already been inserted, on the inner peripheral surface side of the main body portion 24a of the fourth lens group unit 24.

The side yokes 42c and 43c are magnetically integrated with the ends of the main yokes 42a and 43a, and are fixed to the fourth lens group unit 24 with screws 44 as shown in FIG. 14B.

At this point, on the inner peripheral surface side of the main body portion 24a of the fourth lens group unit 24, as shown in FIG. 15C, the ends of the actuators 42 and 43 are covered by the side yokes 42c and 43c.

Figure 16B:
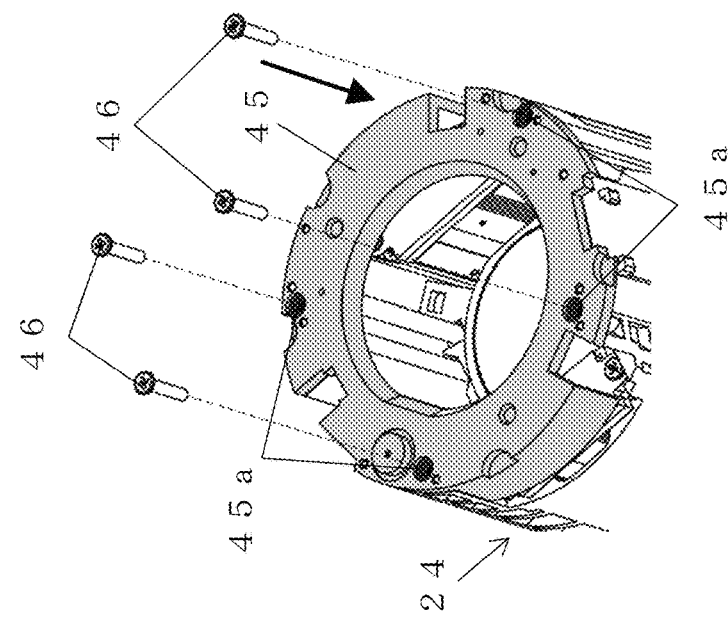
FIG. 16B is an oblique view of a state in which the shaft holder attached in FIG. 16A is fixed with screws.
Figure 16A:
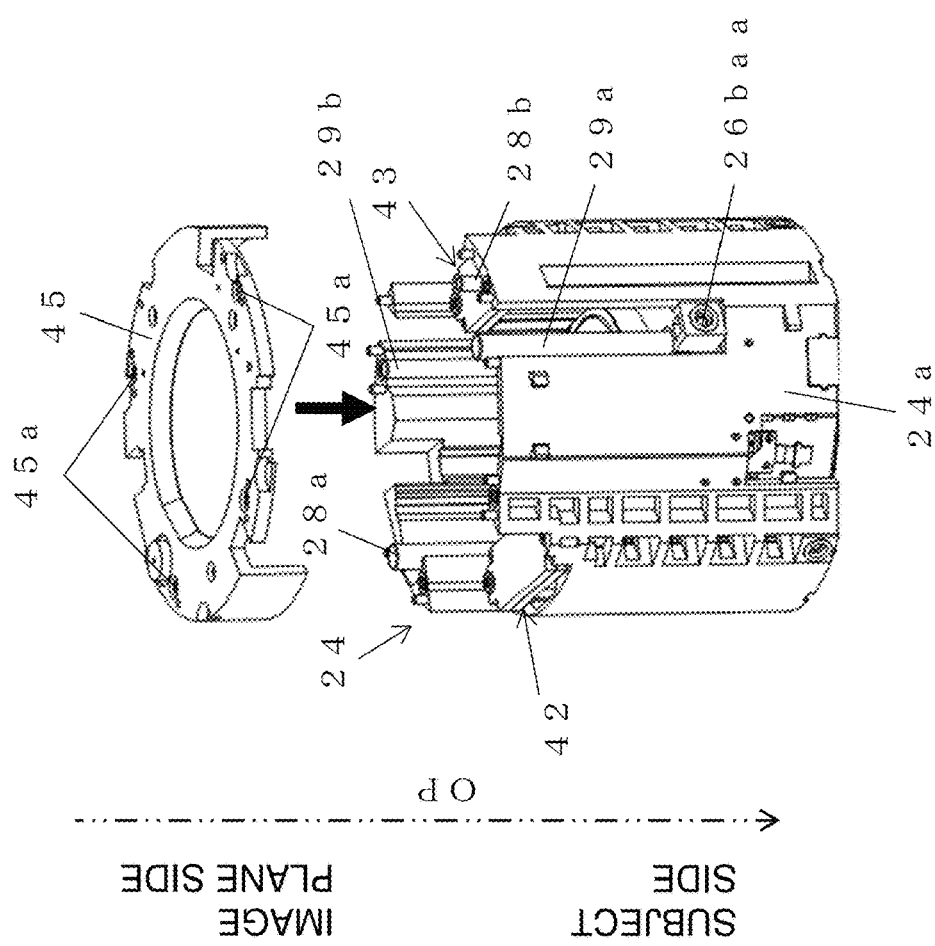
FIG. 16A is an oblique view of a state in which a shaft holder is attached to the end portion of the fourth lens group unit on the image plane side.

Next, as shown in FIG. 16A, the shaft holder 45 is attached to the end on the image plane side in a state in which the fifth lens group unit 25, the sixth lens group unit 26, and the two actuators 42 and 43 have been inserted on the inner peripheral surface side of the main body portion 24a of the fourth lens group unit 24.

As shown in FIG. 16A, the shaft holder 45 is a substantially annular member and has four screw holes 45a formed in a flat surface portion. The shaft holder 45 holds the guide shaft 28a and the sub-guide shaft 28b used for the fifth lens group unit 25 attached on the inner peripheral surface side of the main body portion 24a of the fourth lens group unit 24, and the second ends of the guide shaft 29a and the sub-guide shaft 29b used for the sixth lens group unit 26.

Consequently, the guide shaft 28a and the sub-guide shaft 28b used for the fifth lens group unit 25, and the guide shaft 29a and the sub-guide shaft 29b used for the sixth lens group unit 26 are held at their first end on the subject side by the fourth lens group unit 24, and at their second end on the image plane side by the shaft holder 45.

As shown in FIG. 16B, the shaft holder 45 is fixed to the end surface on the image plane side of the fourth lens group unit 24 by inserting four screws 46 and threading them into screw holes 45a.

Next, as shown in FIG. 17A, the unit to which the fourth, fifth, and sixth lens group units 24, 25, and 26 have been assembled is inserted on the inner peripheral surface side of the rectilinear cylinder 11 in a state in which the rectilinear cylinder 11 has been inserted on the inner peripheral surface side of the cam cylinder 12.

Then, as shown in FIG. 17B, the unit to which the fourth, fifth, and sixth lens group units 24, 25, and 26 have been assembled is attached at a specific position on the inner peripheral surface side of the rectilinear cylinder 11.

Figure 18A:
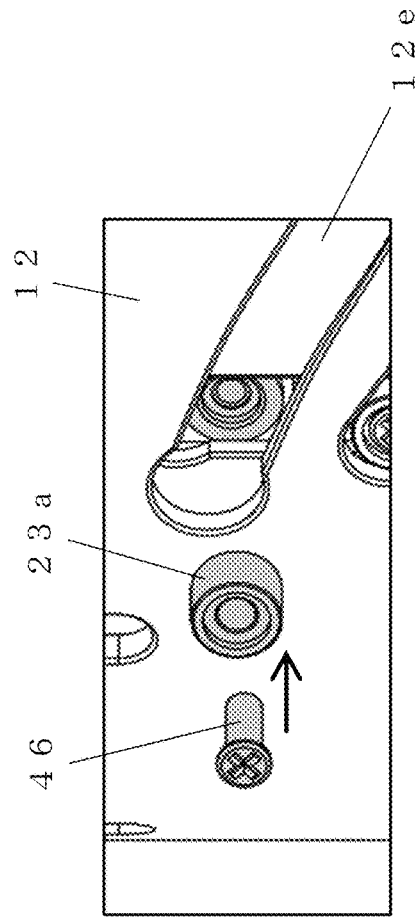
FIG. 18A is an oblique view of a state in which a cam follower is attached from the outer peripheral surface side of the cam cylinder.

At this point, as shown in FIG. 18A, the cam follower 23a, the cam follower 24b, the main cam follower 26ba, and the reinforcing cam follower 26bb of the lens group units 23, 24, and 26 are fixed with screws 46 to the cam follower fixing portions 26baa, etc., of the main body portions 24a and 26a of the lens group units 23, 24, and 26 from the outer peripheral surface side of the cam cylinder 12.

Figure 18B:
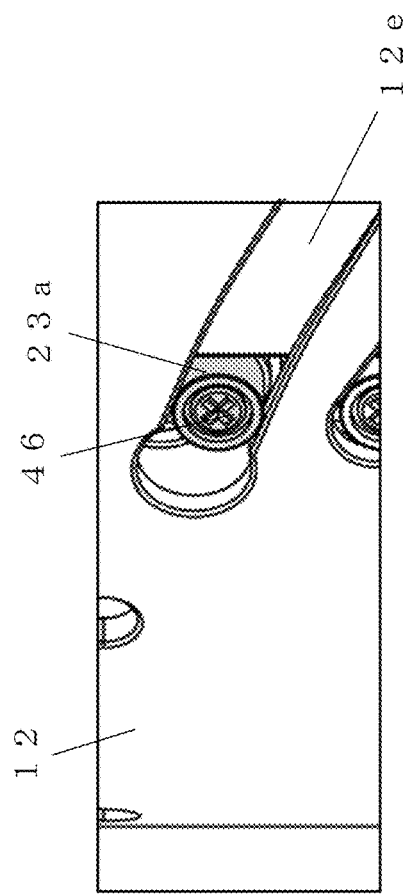
FIG. 18B is an oblique view of a state in which the cam follower attached in FIG. 18A is fixed with a screw.

The cam followers 23a and 24b, the main cam follower 26ba, and the reinforcing cam follower 26bb fixed by the screws 46 then move in a state of being engaged with the cam groove 12e and the like formed in the cam cylinder 12, as shown in FIG. 18B.

FIGS. 18A and 18B show, as an example, a state in which the cam follower 23a is inserted and attached in the cam groove 12e, but the cam follower 24b, the main cam follower 26ba, and the reinforcing cam follower 26bb are similarly attached to the outer peripheral surface (cam follower fixing portion 26baa, etc.) of the main body portion 24a of the fourth lens group unit 24 and the main body portion 26a of the sixth lens group unit 26.

Main Features

The lens support mechanism 10 in this embodiment comprises the fourth lens group unit 24, the sixth lens group unit 26, the substantially cylindrical rectilinear cylinder 11, the substantially cylindrical cam cylinder 12, and the guide shaft 29a. The fourth lens group unit 24 has the fourth lens group lens L4, the main body 24a that holds the fourth lens group lens L4, and the cam followers 24b that protrude outward from the outer peripheral surface of the main body 24a in the radial direction centered on the optical axis OP of the fourth lens group lens L4. The sixth lens group unit 26 has the sixth lens group lens L6, the main body portion 26a that holds the sixth lens group lens L6, the main cam follower 26ba that protrudes outward from the outer peripheral surface of the main body portion 26a in the radial direction centered on the optical axis OP of the sixth lens group lens L6, and the insertion opening 26c provided so as to pass through the main body portion 26a along the optical axis OP direction. The substantially cylindrical rectilinear cylinder 11 is provided on the outer peripheral side of the fourth lens group unit 24 and the sixth lens group unit 26, and has the rectilinear groove 11e ("rotation restricting portion" as claimed) into which the cam followers 24b are inserted to restrict the rotation of the fourth lens group unit 24. The cam groove 12e and the cam groove 12h with which the cam followers 24b and the main cam follower 26ba engage are formed in the substantially cylindrical cam cylinder 12, and when the cam cylinder 12 rotates with respect to the rectilinear cylinder 11, the fourth lens group unit 24 and the sixth lens group unit 26 are moved in the optical axis OP direction. The guide shaft 29a is a rod-shaped member whose first end on the subject side is fixed to the fourth lens group unit 24 and is inserted into the insertion opening 26c to guide the sixth lens group unit 26 in the optical axis OP direction.

Consequently, in the configuration of the lens barrel 100 in which the fourth lens group unit 24 and the sixth lens group unit 26 move back and forth in the optical axis OP direction when the cam cylinder 12 rotates with respect to the rectilinear cylinder 11, the sixth lens group unit 26 is axially suspended by the guide shaft 29a that is fixed at its first end to the fourth lens group unit 24.

Therefore, in the sixth lens group unit 26, the main cam follower 26ba and the reinforcing cam follower 26bb move along the cam grooves 12h and 12i while being supported by the guide shaft 29a, and thereby move in the optical axis OP direction along with the rotation of the cam cylinder 12.

As a result, the number of cam followers 26ba and 26bb of the sixth lens group unit 26 can be reduced to two or less, which means that there is more latitude in design than with a conventional configuration, and a smaller lens barrel 100 can be obtained.

In particular, with a configuration as in this embodiment, in which two actuators 42 and 43 that drive the fifth lens group unit 25, including the lens group lens L5 as the focus lens, back and forth in the optical axis OP direction are provided on the inner peripheral surface side of the fourth lens group unit 24, space is limited on the inner peripheral surface side of the fourth lens group unit 24.

Consequently, as in this embodiment, if the sixth lens group unit 26 is axially suspended from a guide shaft that is fixed at its first end to the fourth lens group unit 24, the number of cam followers 26ba and 26bb of the sixth lens group unit 26 can be reduced to two or less.

Therefore, even when the cam cylinder 12 rotates with respect to the rectilinear cylinder 11 and the sixth lens group unit 26 moves back and forth in the optical axis OP direction, the cam follower 26ba and so forth of the sixth lens group unit 26 can be prevented from interfering with the actuators 42 and 43 and other such parts.

Other Embodiments

An embodiment of the present disclosure was described above, but the present disclosure is not limited to or by the above embodiment, and various modifications are possible without departing from the gist of the disclosure.

(A)

In the above embodiment, an example was given in which the main cam follower 26ba and the reinforcing cam follower 26bb of the sixth lens group unit 26, corresponding to the second cam followers of the second lens group unit, were provided, but the present disclosure is not limited to this.

For example, the configuration may be such that a single main cam follower is provided as the second cam follower, that is, a configuration in which a reinforcing cam follower is not provided.

(B)

In the above embodiment, an example was given in which three cam followers 24b of the four lens group unit 24, corresponding to the first cam follower of the first lens group unit, were provided, but the present disclosure is not limited to this.

For example, four or more cam followers of the fourth lens group unit may be provided.

(C)

In the above embodiment, an example was given in which the sixth lens group unit 26, corresponding to the second lens group unit, and the fifth lens group unit 25, corresponding to the third lens group unit, moved back and forth in the optical axis OP direction along separate guide shafts 28a and 29a. However, the present disclosure is not limited to this.

For example, the second lens group unit and the third lens group unit may be configured to move back and forth in the optical axis direction along a common guide shaft.

(D)

In the above embodiment, an example was given in which the sixth lens group unit 26, corresponding to the second lens group unit, and the fifth lens group unit 25, corresponding to the third lens group unit, move back and forth in the OP optical axis direction along the two guide shafts 28a and 29a and sub-guide shafts 28b and 29b, respectively. However, the present disclosure is not limited to this.

For example, the configuration may be such that there is no sub-guide shaft, and the second lens group unit and the third lens group unit move back and forth in the optical axis direction along just the main guide shaft.

(E)

In the above embodiment, an example was given in which the two actuators 42 and 43 were provided to drive the fifth lens group unit 25 corresponding to the third lens group unit in the optical axis OP direction. However, the present disclosure is not limited to this.

For example, the configuration may be such that just one actuator is provided to drive the third lens group unit in the optical axis direction.

(F)

In the above embodiment, an example was given in which the two actuators 42 and 43 were provided to drive the fifth lens group unit 25, including the fifth lens group lens L5 as a focus lens, in the optical axis OP direction. However, the present disclosure is not limited to this.

For example, the configuration may be such that one or three or more actuators provided to drive the lens group unit including the focus lens in the optical axis direction.

(G)

In the above embodiment, an example was given in which the present disclosure was applied to the lens barrel 100, which could be attached to and detached from the camera body 101. However, the present disclosure is not limited to this.

For example, the present disclosure may be applied not to a detachable lens barrel, but to a lens barrel that is integrated with the camera body and cannot be removed.

INDUSTRIAL APPLICABILITY

Since the lens support mechanism disclosed herein has the effect of affording greater latitude in design and allowing a reduction in size as compared to a conventional configuration, it can be widely applied to lens barrels and the like that include a lens support mechanism.

The invention claimed is:

1. A lens support mechanism, comprising:
   a first lens group unit, having a first lens group; a first main body portion that holds the first lens group; and a first cam follower that protrudes outward from an outer peripheral surface of the first main body portion in a radial direction centered on an optical axis of the first lens group;
   a second lens group unit having a second lens group; a second main body portion that holds the second lens group; one or two second cam followers that protrude outward from an outer peripheral surface of the second main body portion in a radial direction centered on an optical axis of the second lens group; and a first insertion opening that is provided so as to pass through the second main body portion along an optical axis direction;
   a substantially cylindrical fixed cylinder has a rotation restricting portion that is provided on an outer peripheral side of the first lens group unit and the second lens group unit and into which the first cam follower is inserted to restrict the rotation of the first lens group unit;
   a substantially cylindrical cam cylinder in which is formed a first cam groove and a second cam groove in which the first cam follower and the second cam follower are engaged, and which rotates with respect to the fixed cylinder to move the first lens group unit and the second lens group unit in the optical axis direction; and
   a guide shaft that is a rod-shaped member having a first end portion and a second end portion on an opposite side from the first end portion, the first end portion being fixed to the first lens group unit, and that is inserted into the first insertion opening and guides the second lens group unit in the optical axis direction.

2. The lens support mechanism according to claim 1, further comprising:
   a third lens group unit that has a third lens group, a third main body portion that holds the third lens group, and a second insertion opening that is provided to the third main body portion and into which the guide shaft is inserted, this third lens group unit being provided between the first lens group unit and the second lens group unit; and
   an actuator configured to apply a driving force for moving the third lens group unit along the guide shaft in the optical axis direction.

3. The lens support mechanism according to claim 2, wherein in a state in which the first lens group unit and the second lens group unit are closest to each other, the second cam follower is disposed at the same position in the optical axis direction, but offset in the circumferential direction, with respect to the actuator.

4. The lens support mechanism according to claim 2, wherein in a state in which the first lens group unit and the second lens group unit are closest to each other, the second lens group unit is disposed at the same position in the optical axis direction, but offset in the circumferential direction, with respect to the actuator.

5. The lens support mechanism according to claim 2, wherein the third lens group is a focus lens.

6. The lens support mechanism according to claim 2, wherein two or more actuators are provided.

7. The lens support mechanism according to claim 1,
wherein the second lens group unit has, as the second cam follower, a main cam follower that is provided near the first insertion opening into which the guide shaft is inserted, and that is inserted into the second cam groove of the cam cylinder, and a reinforcing cam follower that is protrudes outward in the radial direction from the outer peripheral surface of the second main body portion.

8. The lens support mechanism according to claim 1,
wherein the second lens group unit has a single second cam follower.

9. The lens support mechanism according to claim 1,
wherein the rotation restricting portion is a rectilinear groove that is provided to the fixed cylinder along the optical axis direction.

10. The lens support mechanism according to claim 1,
wherein three first cam followers are provided.

11. A lens barrel, comprising
the lens support mechanism according to claim 1.

12. A camera, comprising:
the lens barrel according to claim 11; and
a camera body to which the lens barrel is mounted.

* * * * *